US012447930B2

(12) United States Patent
Makihara et al.

(10) Patent No.: US 12,447,930 B2
(45) Date of Patent: Oct. 21, 2025

(54) WIPER DEVICE FOR VEHICLE AND CONTROL METHOD THEREOF

(71) Applicant: DENSO CORPORATION, Kariya (JP)

(72) Inventors: Tomohide Makihara, Kariya (JP); Ryoji Ueji, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 18/387,530

(22) Filed: Nov. 7, 2023

(65) Prior Publication Data

US 2024/0075904 A1 Mar. 7, 2024

Related U.S. Application Data

(63) Continuation of application No. PCT/JP2022/017428, filed on Apr. 8, 2022.

(30) Foreign Application Priority Data

May 14, 2021 (JP) .................. 2021-082264

(51) Int. Cl.
*B60S 1/08* (2006.01)
(52) U.S. Cl.
CPC ........... *B60S 1/0814* (2013.01); *B60S 1/0822* (2013.01)

(58) Field of Classification Search
CPC ............................. B60S 1/0814; B60S 1/0822
See application file for complete search history.

(56) References Cited

U.S. PATENT DOCUMENTS

| 2006/0006826 | A1* | 1/2006 | Morishita | ............. B60S 1/0896 318/443 |
| 2017/0158172 | A1* | 6/2017 | Ikeda | ......................... B60S 1/28 |
| 2020/0353896 | A1* | 11/2020 | Sugimoto | ............. B60S 1/0452 |

FOREIGN PATENT DOCUMENTS

JP 2005-231590 A 9/2005

* cited by examiner

*Primary Examiner* — Zoheb S Imtiaz
(74) *Attorney, Agent, or Firm* — Oliff PLC

(57) ABSTRACT

A vehicle wiper device includes: a wiper motor; a control unit that drives the wiper motor to be reciprocally rotated and controls a rotation speed of the wiper motor; and a wiper reciprocally rotating to wipe a wiped surface of a vehicle with a blade rubber, in which a tilt direction of a lip part of the blade rubber changes when a rotation direction is reversed. The control unit accelerates a rotation speed of the wiper motor, in a first acceleration section, from 0 to a first speed which is a low speed at a first average acceleration, and to rapidly accelerate the rotation speed of the motor, in a first half of a second acceleration section, to reach a speed which is higher than the first speed and ½ times of a second speed at an average acceleration which is twice or more of the first average acceleration.

10 Claims, 15 Drawing Sheets

WIPER DEVICE FOR VEHICLE AND CONTROL METHOD THEREOF

CROSS REFERENCE OF RELATED APPLICATION

This application is the U.S. bypass application of International Application No, PCT/JP2022/017428 filed on Apr. 8, 2022, which designated the U.S. and claims priority to Japanese Application No. 2021-082264 filed on May 14, 2021, the contents of which is incorporated herein by reference.

BACKGROUND

Technical Field

The present disclosure relates to a vehicle wiper device and a control method thereof.

Description of the Related Art

As an example, according to one wiper control device, a crank arm coupled to an output shaft of a wiper motor and a wiper supported by a pivot shaft are coupled with each other by a link mechanism. The link mechanism converts a unidirectional rotation movement of a wiper motor into a reciprocating rotational movement of the wiper. Thus, a blade rubber of the wiper moves in a reciprocating rotational movement while causing a lip part thereof to be inclined on a wind shield glass, thereby wiping the surface of the wind shield glass. When wiping the surface of the windshield glass, the rotational angle of the crank arm is detected by a detection means, and a driving control means controls a driving of the wiper motor based on the detection result.

SUMMARY

The present disclosure is to provide a vehicle wiper including: a wiper motor; a control unit that drives the wiper motor to be reciprocally rotated and controls a rotation speed of the wiper motor; and a wiper reciprocally rotating by receiving a reciprocal rotation of the wiper motor to reciprocally wipe a wiped surface of a vehicle with a blade rubber, in which a tilt direction of a lip part of the blade rubber changes when a rotation direction is reversed. The control unit is configured to accelerate a rotation speed of the wiper motor, in a first acceleration section where a tilt direction of the lip part is changed, from 0 to a first speed which is a low speed at a first average acceleration, and to rapidly accelerate the rotation speed of the motor, in a first half of a second acceleration section subsequent to the first acceleration section, to reach a speed which is higher than the first speed and ½ times of a second speed at an average acceleration which is twice or more of the first average acceleration.

BRIEF DESCRIPTION OF THE DRAWINGS

The above-described object and other objects, above features and advantages of the present disclosure will be clarified further by the following detailed description with reference to the accompanying drawings. The drawings are.

DETAILED DESCRIPTION OF THE PREFERRED EMBODIMENTS

Figure 1:
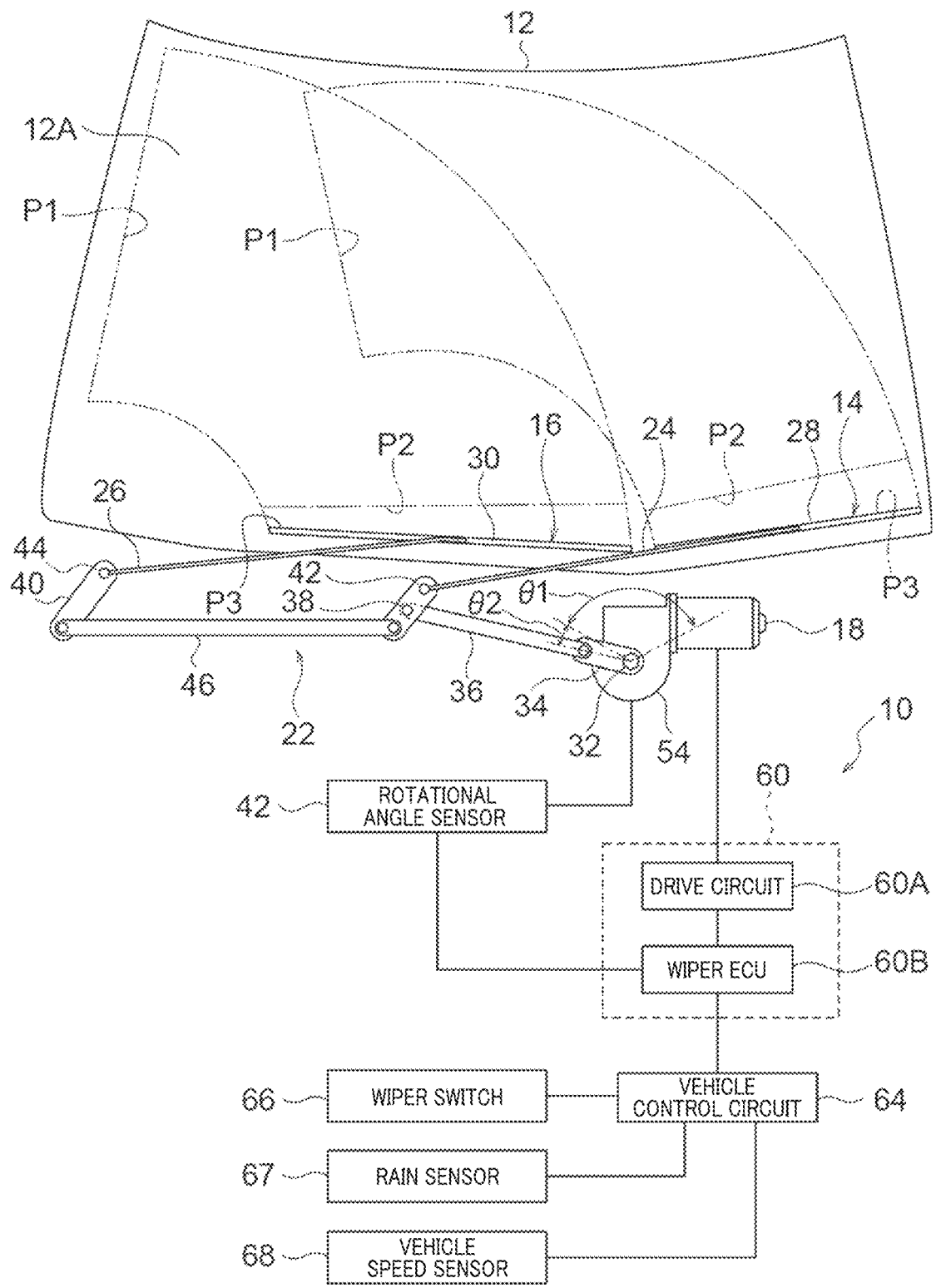
FIG. 1 is an overall diagram showing a configuration of a vehicle wiper device according to a first embodiment.

According to a wiper control device disclosed by JP-A-2005-231590, a crank arm coupled to an output shaft of a wiper motor and a wiper supported by a pivot shaft are coupled with each other by a link mechanism. The link mechanism converts a unidirectional rotation movement of a wiper motor into a reciprocating rotational movement of the wiper. Thus, a blade rubber of the wiper moves in a reciprocating rotational movement while causing a lip part thereof to be inclined on a wind shield glass, thereby wiping the surface of the wind shield glass. When wiping the surface of the windshield glass, the rotational angle of the crank arm is detected by a detection means, and a driving control means controls a driving of the wiper motor based on the detection result.

The above-mentioned driving control means controls a rotation speed of the wiper motor to be the lowest at an intermediate position between a reversing start position and a reversing stopped position of the blade rubber when the wiper movement direction is reversed, and controls the rotation speed of the wiper to be increased. At this point, the wiper motor is rotationally driven with a minimum value for not stopping the rotation of the wiper motor, thereby preventing the passenger from feeling the stop period of the wiper to be longer when the wiper reverses direction. Further, when the blade rubber turns over, the wiper rotation speed is caused to be sufficiently decreased and the wiper wiping speed is prevented from increasing rapidly. Hence, occurrence of a reversing sound when the lip part of the blade rubber turns the tilt direction thereof is avoided.

According to the above-described prior art, when simply decreasing the rotation speed of the wiper motor near the reversing position of the wiper, since the rotation speed of the wiper when reversing is decreased and a frictional coefficient of the blade rubber with respect to the wind shield becomes higher, a so-called chattering phenomenon is induced. Hence, it is difficult to significantly decrease the rotation speed of the wiper motor from the reversing position of the wiper. As a result, a turning speed of the lip part of the wiper blade in the tilt direction cannot be sufficiently decreased and an effect of reducing the reversing sound is insufficient. Furthermore, according to the above-described prior art, the link mechanism used for converting the unidirectional rotation movement of a wiper motor into the reciprocating rotational movement of the wiper requires a large mounting space, especially requires a space for allowing the crank arm to rotate by 360°. Hence, it is required to improve the above configuration for improving the mountability to the vehicle.

First Embodiment

Hereinafter, with reference to FIGS. 1 to 17, a vehicle wiper device 10 and a method thereof according to a first embodiment of the present disclosure will be described. The vehicle wiper device 10 according to the present embodiment is for wiping a surface to be wiped (wiped surface) 12A set on an outer surface of a windshield glass 12 included in a vehicle such as a car. The vehicle wiper device 10 is provided with a pair of wipers 14 and 16, a wiper motor 18, a link mechanism 22 and a wiper control circuit 60 as a control unit. The wiper control circuit 60 executes the above-described method.

The wipers 14 and 16 are configured as a tandem type wiper in which respective wipers synchronize and wipe the wiped surface in the same direction, for example. The wipers 14 and 16 include wiper arms 24 and 26 respectively and wiper blades 28 and 30 respectively. Each of the wiper arms 24 and 26, and each of the wiper blades 28 and 30 is configured to have longitudinal shape. One end (base end portion) of the wiper arms 24 and 26 in the longitudinal direction are fixed to the pivot shafts 42 and 44. The pivot shafts 42 and 44 are rotatably supported by a pivot folder (not shown) provided on the vehicle body. The wiper arms 24 and 26 are capable of moving as a reciprocating rotational movement around the pivot shafts 42 and 44 respectively.

Figure 2:
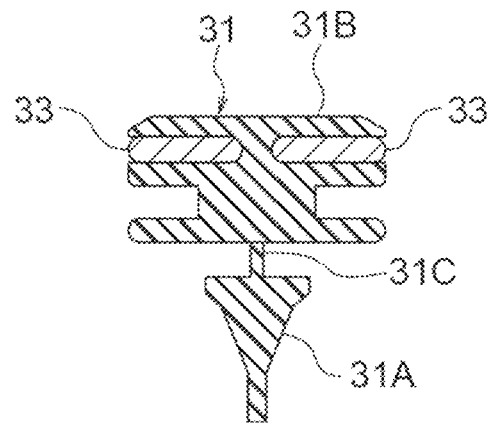
FIG. 2 is a cross-sectional view of a configuration of a blade rubber.
Figure 3:
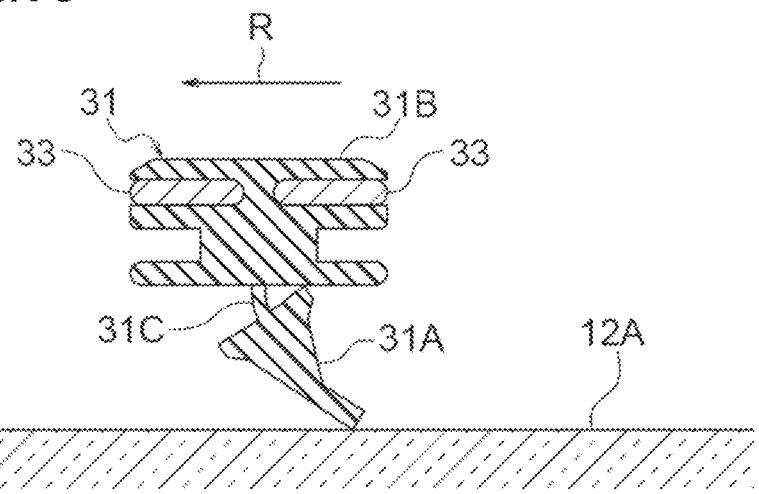
FIG. 3 is a cross-sectional view showing the blade rubber moving towards one side in a reciprocating rotational movement direction.
Figure 4:
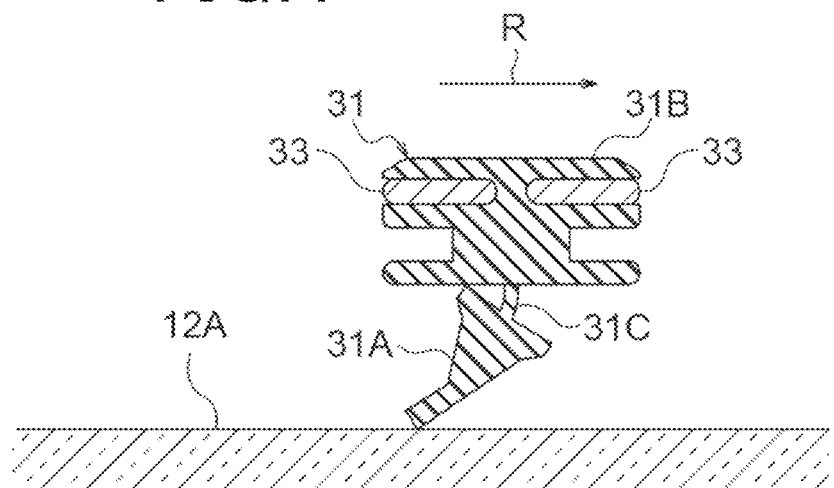
FIG. 4 is a cross-sectional view showing a blade rubber moving towards the other side in the reciprocating rotational movement direction.

The wiper blades 28 and 30 are each provided with a blade rubber 31 (see FIG. 2) made of rubber or the like and a support member (not shown) that supports the blade rubber 31. The blade rubber 31 and respective support members are each formed in a longitudinal shape. A longitudinal intermediate portion of each support member is coupled to a longitudinal other end portion (tip end portion). The tip end portions of the wiper arms 24 and 26 are urged to the wiped surface 12A by a urging member (not shown). As shown in FIGS. 3 and 4, each blade rubber 31 of the wiper blades 28 and 30 are pressed on the wiped surface 12A, in FIGS. 3 and 4, an arrow R indicates a rotation direction (movement direction) of the blade rubber 31.

The wiper blade 28 and 30 together with the wiper arms 24 and 26 move around the pivot shafts 42 and 44 as a reciprocating rotational movement, whereby the wiped surface 12A is reciprocally wiped by the respective blade rubber 31. As shown in FIGS. 2 to 4, the blade rubber 31 is provided with a lip part (wiping portion) 31A, a support portion 31B and a neck portion 31C. The lip part 31A touches the wiped surface 12A for wiping and the cross-section thereof is formed in a substantial reverse-triangular shape. The support portion 31B is supported by the above-described support member. The neck portion 31C is formed in a thin shape and connects the lip part 31A and the support portion 31B.

The support portion 31B of the blade rubber 31 is provided with a pair of support groove (reference symbols is omitted) along the longitudinal direction thereof (direction perpendicular to paper surface in FIGS. 2 to 4). In each support groove, a backing 33 formed in a longitudinal plate shape by a spring material for example is embedded therein. The blade rubber 31 rotates while causing a tip end portion of the lip part 31A to slide on the wiped surface 12A. As shown in FIGS. 3 and 4, the blade rubber 31 is configured such that the tilt direction of the lip part 31A is changed depending on the rotation direction (movement direction).

The wiper motor 18 includes a deceleration mechanism 52 including, for example, a worm gear, and configured to be capable of causing an output shaft 32 disposed in the deceleration mechanism 52 to rotate in normal and reverse directions. The link mechanism 22 is provided with a crank arm 34, a first link rod 36, a pair of pivot levers 38 and 40, the above-described pair of pivot shafts 42 and 33, and a second link rod 46.

The one end portion of the crank arm 34 is fixed to the output shaft 32. The other end of the crank arm 34 is rotatably coupled to one end portion of the first link rod 36. The other end portion of the first link rod 36 is coupled to an intermediate portion of the pivot lever 38. Both end portions of the second link road 46 are rotatably coupled to one end portions of the pivot levers 38 and 40. The other end portions of the pivot levers 38 and 40 are fixed to the pivot shafts 42 and 44.

When the output shaft 32 of the wiper motor 18 reciprocally rotate (rotate in normal and reverse directions) with a rotational angle θ1 having a predetermined range, the rotational force of the output shaft 32 is transmitted to the wiper arms 24 and 26 via the link mechanism 22, whereby the wiper arms 24 and 26 reciprocally rotate. Thus, the wiper blades 28 and 30 coupled to the tip end portions of the wiper arms 24 and 26 reciprocally rotate between a lower reversing position P2 and an upper reversing position P1 set on the windshield glass 12, The value of the above-described rotational angle θ1 takes any values depending on the configuration of the link mechanism 22. According to the present embodiment, the rotational angle θ1 is set to be 140°, for example.

Further, according to the present embodiment, as shown in FIG. 1, when the wiper blades 28 and 30 are arranged at a storage position P3 positioned below the lower reversing position P2, the crank arm 34 and the first link rod 36 are linearly arranged. The output shaft 32 rotates by the rotational angle θ2 from a state where the wiper blades 28 and 30 are positioned at the lower reversing position P2, thereby causing the wiper blades 28 and 30 to rotate to be at the storage position P3. The value of the above-described rotational angle θ2 takes any values depending on the configuration of the link mechanism 22. According to the present embodiment, the rotational angle θ2 is set to be 10°, for example. When the rotational angle is 0, the lower reversing position P2 and the storage position P3 are the same, the wiper blades 28 and 30 are stopped at the lower reversing position P2 and stored at the same position.

The wiper motor 18 is connected to a wiper control circuit 60 that drives the wiper motor 18 to be reciprocally rotated and controls the rotation speed of the wiper motor 18. The wiper control circuit 60 is provided in the deceleration mechanism 52 of the wiper motor 18, including a drive circuit 60A and a wiper ECU 60B. A rotational angle sensor 42 that detects a rotation speed and a rotational angle of the output shaft 32 of the wiper motor 18 is connected to the wiper ECU 60B, The rotational angle sensor 42 is provided in the deceleration mechanism 52 of the wiper motor 18. The rotational angle sensor 42 converts a magnetic field (magnetic force) of an excitation coil or magnet which rotates together with the output shaft 32 to be a current as detection value.

Since the above-described wiper motor 18 has the deceleration mechanism 52, the rotation speed and the rotational angle of the output shaft 32 are not the same as the rotation speed and the rotational angle of the motor body of the wiper motor 18. However, according to the present embodiment, since the motor body of the wiper motor 18 and the deceleration mechanism 52 are integrally formed to be inseparable, hereinafter, the rotation speed and the rotational angle of the output shaft 32 are assumed to be regarded as the rotation speed and the rotational angle of the wiper motor 18.

The wiper ECU 60B calculates the positions of the wiper blades 28 and 30 on the windshield glass 12 based on the signal from the rotational angle sensor 42. Further, the wiper ECU 60B controls the drive circuit 60A such that the rotation speed of the output shaft 32 changes depending on the calculated positions.

The drive circuit 60A generates power for driving the wiper motor 18 by PWM (pulse width control) control and supplies the generated power to the wiper motor 18. The drive circuit 60A includes a circuit using MOSFET (meal oxide semiconductor filed effect transistor) as switching element for example, and outputs a voltage having a predetermined duty ratio by controlling the wiper ECU 60B.

A wiper switch 66 is connected to the wiper ECU 60B via a vehicle control circuit 64. The wiper ECU 60B reads a rotation signal of the output shaft 32 and controls the voltage to be applied to the wiper motor 18 such that the wiper blades 28 and 30 rotate at a desired reciprocal wiping period based on the command signal from the wiper switch 66.

The wiper switch 66 serves as a switch for switching the power supplied from a vehicle battery to the wiper motor to be ON and OFF. The wiper switch 66 switches various selection positions between a low speed operation mode selected position (LO) in which the wipers 14 and 16 operate in a low speed, a high speed operation mode selected position (HI) in which the wipers 14 and 16 operate in a high speed, an intermittent operation mode selected position (INT) in which the wipers 14 and 16 intermittently operate at a constant interval, an automatic mode selected position (AUTO) in which activation or deactivation of the wiping operation or a wiping speed of the wipers 14 and 16 are automatically changed depending on a traveling state and a travelling environment of the vehicle, and a stop mode selected position (OFF) in which operation of the wipers 14 and 14 is stopped, for example.

The wiper switch 66 outputs a command signal used for causing the wiper motor 18 to reciprocally rotate, to the wiper ECU 60B via the vehicle control circuit 64, depending on the selected position of the above-described various modes. For example, the wiper switch 66 is utilized such that the wiper motor 18 is caused to rotate at high speed in the high speed operation mode selected position, caused to rotate at low speed in the low speed operation mode selected position and caused to rotate intermittently in the intermittent operation mode selected position.

When the wiper ECU 60B receives the signal outputted from the wiper switch 66 depending on the selected positions of the respective modes, the wiper ECU 60B performs a control corresponding to the output signal from the wiper switch 66. Specifically, the wiper ECU 60B calculates the rotation speed of the output shaft 32 based on the command signal from the wiper switch 66. Further, the wiper ECU 60B controls the drive circuit 60A so as to rotate the output shaft 32 at the calculated rotation speed.

Further, for the wiper ECU 60B, a rain sensor 67 and a vehicle speed sensor 68 are connected thereto via the vehicle control circuit 64. The rain sensor 67 detects an amount of rain drop as a traveling environment of the vehicle. The vehicle speed sensor 68 detects the travelling speed of the vehicle as the traveling state of the vehicle. The wiper ECU 60B, when the wiper switch 66 is at the automatic selected position, controls the rotation speed of the output shaft 32 based on the detection result of the rain sensor 67 or the vehicle speed sensor 68.

Figure 5:
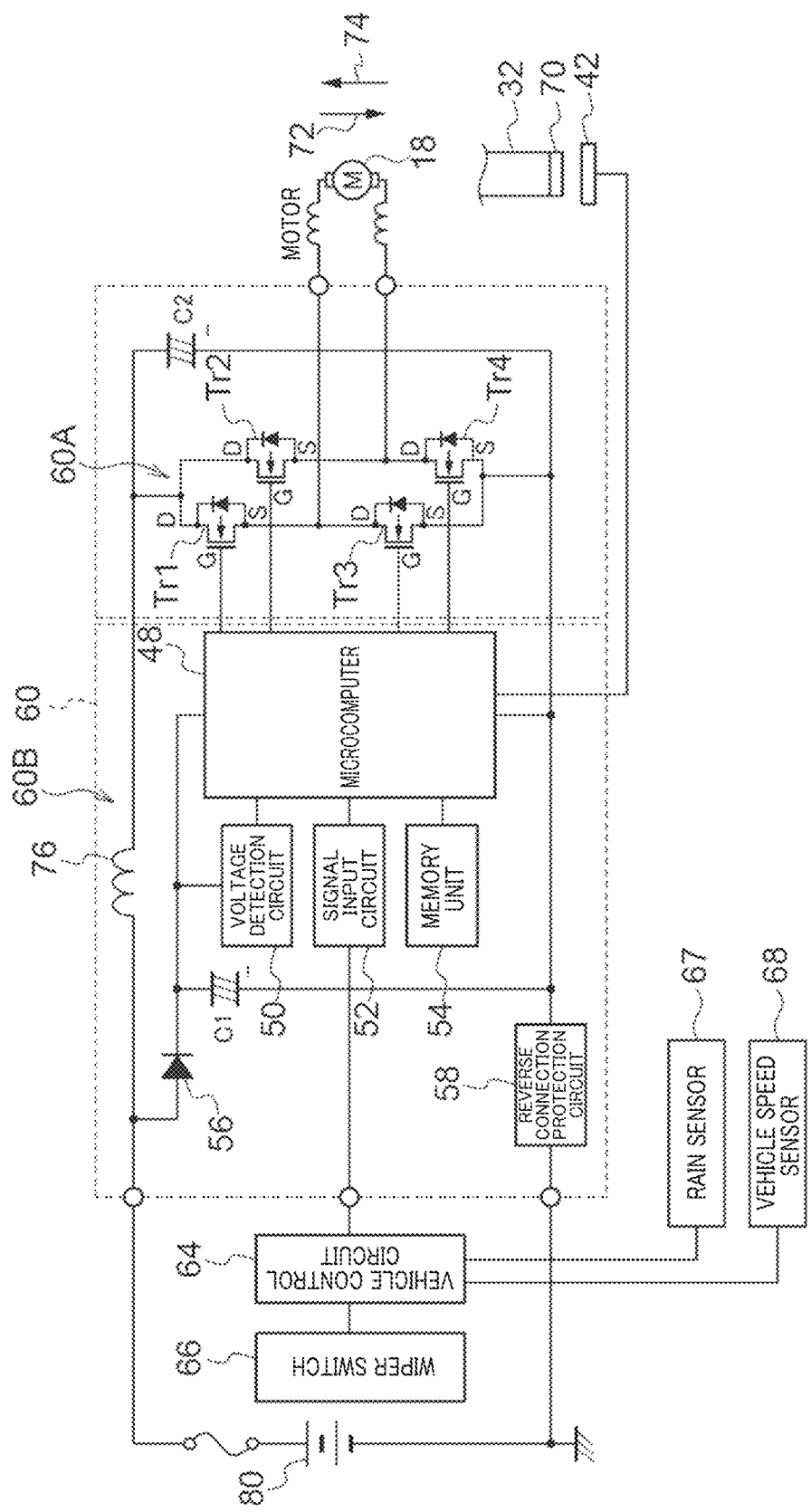
FIG. 5 is a block diagram showing a configuration of the vehicle wiper device according to the first embodiment.

FIG. 5 is a block diagram showing an overall example of a configuration of the wiper control circuit 60. The wiper motor 18 shown in FIG. 5 is configured as a DC motor with brush for example. The wiper control circuit 60 shown in FIG. 5 includes the drive circuit 60A that generates the voltage applied to a winding terminal of the wiper motor 18 and a microcomputer 48 of the wiper ECU 60B that controls the switching elements constituting the drive circuit 60A to be ON and OFF. The microcomputer 48 is supplied with a power of the battery 80 via the diode 56, the voltage of the supplied power is detected by a voltage detection circuit 50 provided between the diode 56 and the microcomputer 48, and the detection result is outputted to the microcomputer 48. Further, an electrolytic capacitor C1 is provided such that one end thereof is connected to a portion between the diode 56 and the microcomputer 48 and the other end (−) is grounded. The electrolytic capacitor C1 is utilized for stabilizing the power source of the microcomputer 48. The electrolytic capacitor C1 stores sudden high voltage such as surge voltage for example, and discharges stored charge to the grounded region, thereby protecting the microcomputer 48.

The microcomputer 48 receives a command signal for commanding the rotation speed of the wiper motor 18 from the wiper switch 66 and the vehicle control circuit 64 via a signal input circuit 52. In the case where the command signal outputted by the wiper switch 66 is an analog signal, the analog signal is converted to a digital signal at the signal input circuit 52 and transmitted to the microcomputer 48.

For the microcomputer 48, the rotational angle sensor 42 is connected thereto for detecting a magnetic field of the sensor magnet 60 that changes depending on a rotation of the output shaft 32. The microcomputer 48 calculates the rotational angle of the output shaft 32 based on the signal outputted by the rotational angle sensor 42, thereby identifying the position of the wiper blades 28 and 30 on the windshield glass 12.

Further, the microcomputer 48 refers to the rotation speed data of the wiper motor 19 determined in accordance with positions of the wiper blades 28 and 30 stored in a memory unit 54 and controls the drive circuit 60A such that the number of rotations of the wiper motor 18 becomes the number of rotations corresponding to the positions of the identified wiper blades 28 and 30.

As shown in FIG. 5, the drive circuit 60A utilizes transistors Tr1, Tr2, TR3 and Tr4 which are N-type FET (filed effect transistor) for switching elements. For the transistor TR1 and the transistor Tr2, each drain is connected to the battery 80 via a noise prevention coil 76. The sources of the transistors and Tr2 are connected to drains of the transistors Tr3 and Tr4, respectively. The sources of the transistor Tr3 and the transistor Tr4 are grounded.

The source of the transistor Tr1 and the drain of the transistor Tr3 are connected to one end of the winding of the wiper motor 18, and the source of the transistor Tr2 and the drain of the transistor Tr4 are connected to the other end of the winding of the wiper motor 18.

The transistor Tr1 and the transistor Tr4 turn ON when high level signal is applied to respective gates of the transistor Tr1 and the transistor Tr4, and a CW current 72 flows to the wiper motor 18 to operate the wiper blades 28 and 30 in a clock wise direction when viewing from a vehicle cabin side. Further, when either one of the transistor Tr1 or the transistor Tr4 is controlled to be ON, the other transistor may be controlled to be ON and OFF in a short period of time using a PWM control, voltage for the CW current 72 can be modulated.

Similarly, the transistor Tr2 and the transistor Tr3 turn ON when high level signal is applied to respective gates of the transistor Tr2 and the transistor Tr3, and a CCW current 74 flows to the wiper motor 18 to operate the wiper blades 28 and 30 in an anti-clock wise direction when viewing from a vehicle cabin side. Further, when either one of the transistor Tr2 or the transistor Tr3 is controlled to be ON, the other transistor may be controlled to be ON and OFF in a short period of time using a PWM control, voltage for the CCW current 74 can be modulated.

According to the present embodiment, a reverser-connection protection circuit 58 and a noise prevention coil 76 are provided between the battery 80 as a power source and the drive circuit 60A and an electrolytic capacitor C2 is disposed to be in parallel to the drive circuit 60A. The noise prevention coil 76 serves as an element that suppresses noise caused by the switching of the drive circuit 60A.

The electrolytic capacitor C2 suppresses noise from the drive circuit 60A, stores rapidly occurring high voltage such as surge voltage, and discharges stored charge to the grounded region, and prevents excessive current flowing into the drive circuit 60A.

The reverse-connection protection circuit 58 is configured to protect elements constituting the wiper control circuit 60 when the positive terminal and the negative terminal of the battery are connected to be in reverse with respect to a case of connection shown in FIG. 5. For example, the reverse-connection protection circuit 58 is configured of a so-called diode-connection FET where the drain and the gate are connected.

Figure 6:
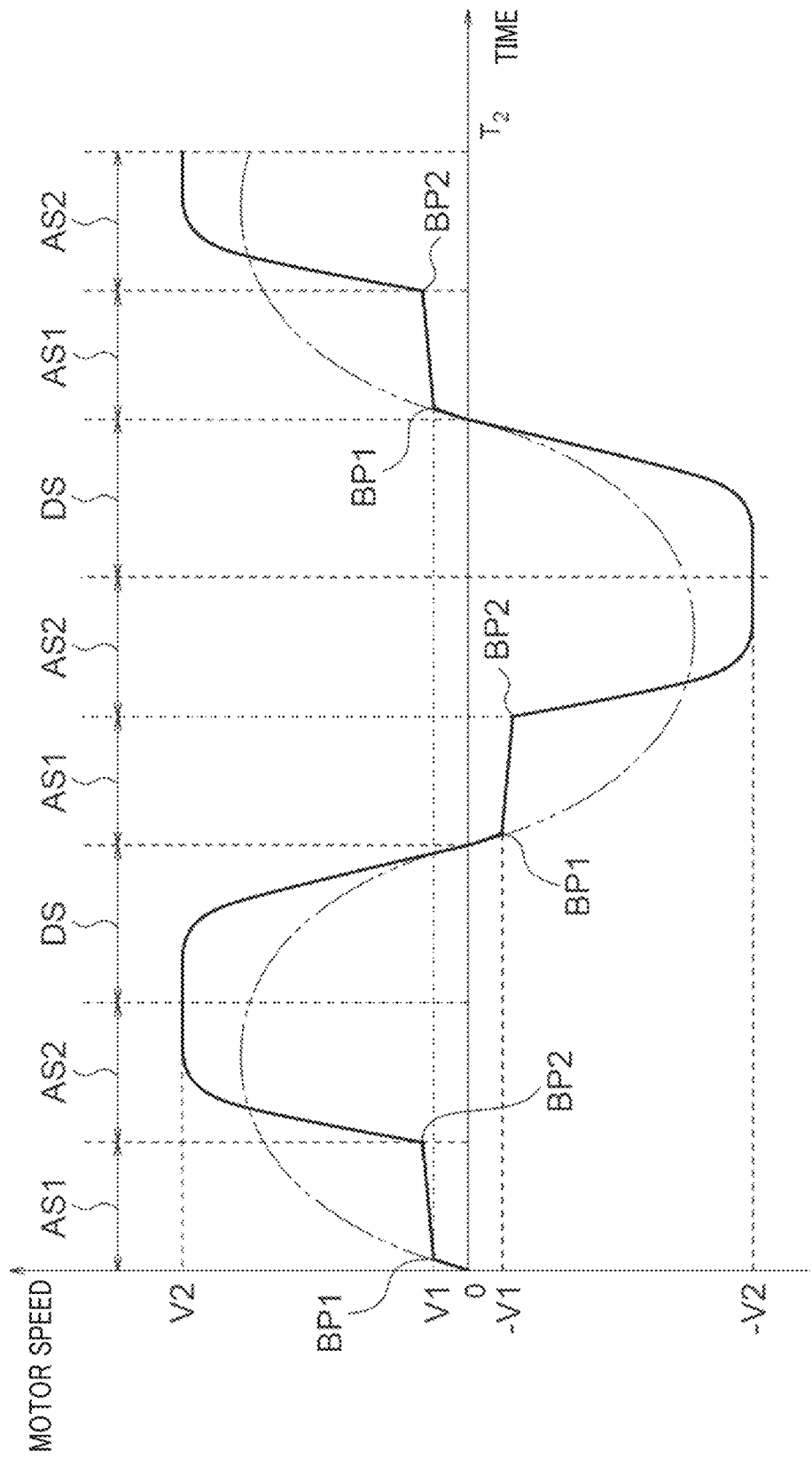
FIG. 6 is a line-graph showing a relationship between a rotation speed of the wiper motor and the time.
Figure 7:
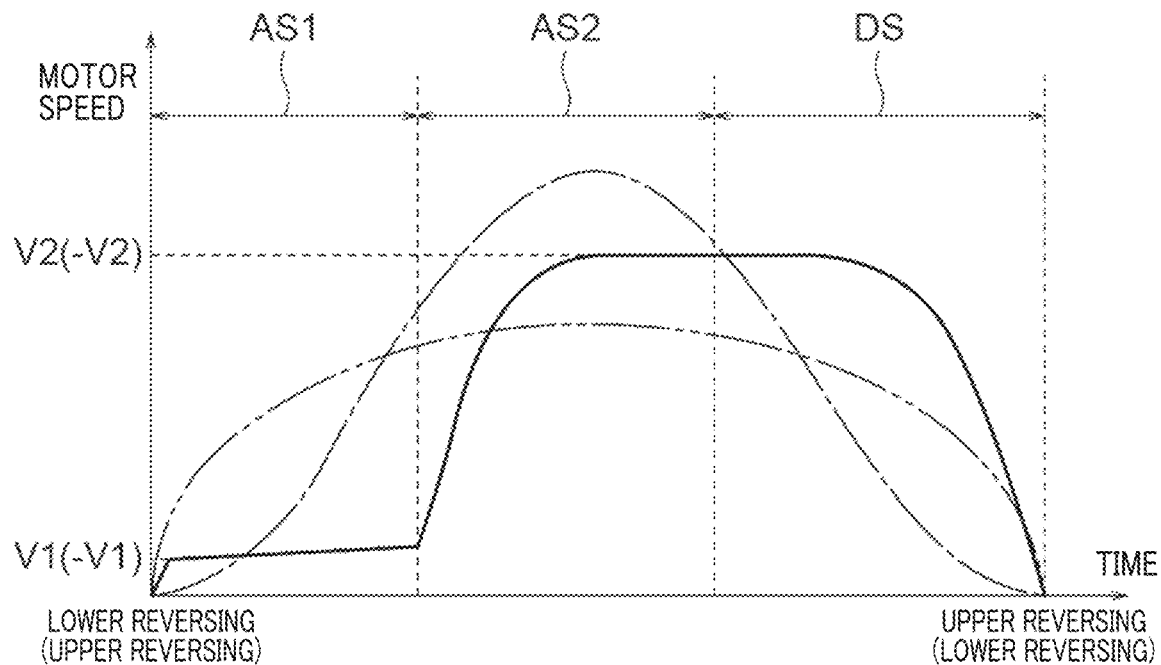
FIG. 7 is a line-graph in which a part of FIG. 6 is shown with a scale changed from FIG. 6.
Figure 8:
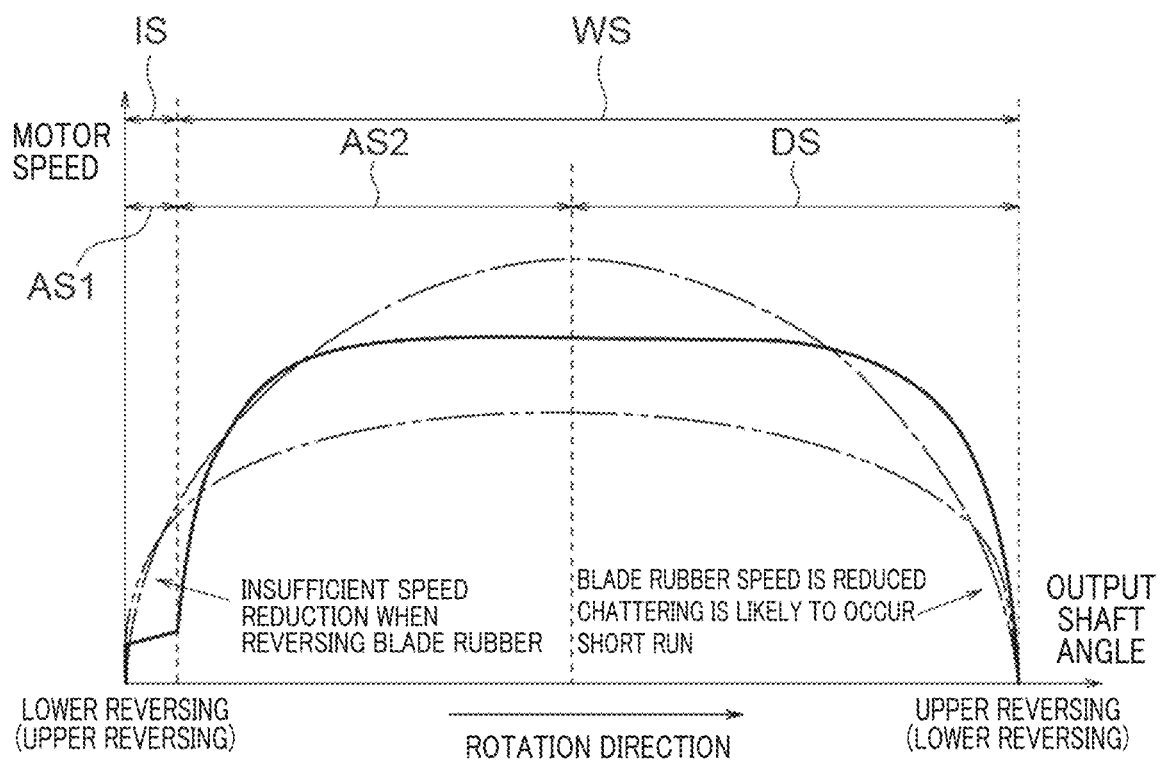
FIG. 8 is a line-graph showing a relationship between the rotation speed of the wiper motor and an angle of an output shaft.
Figure 9:
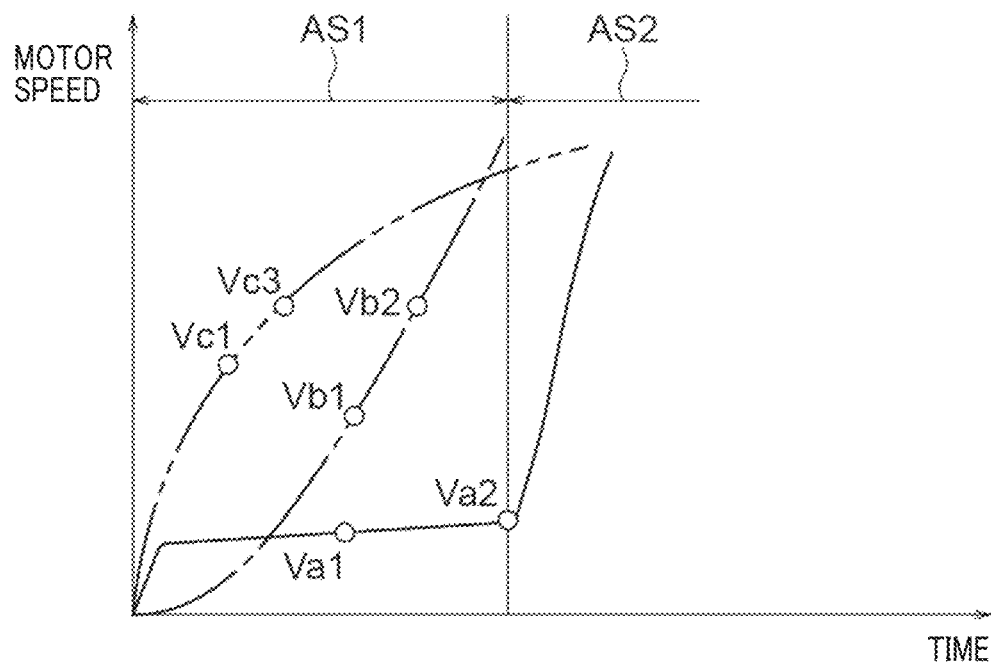
FIG. 9 is a line-graph in which a part of FIG. 7 is shown with a scale changed from FIG. 7.
Figure 10:
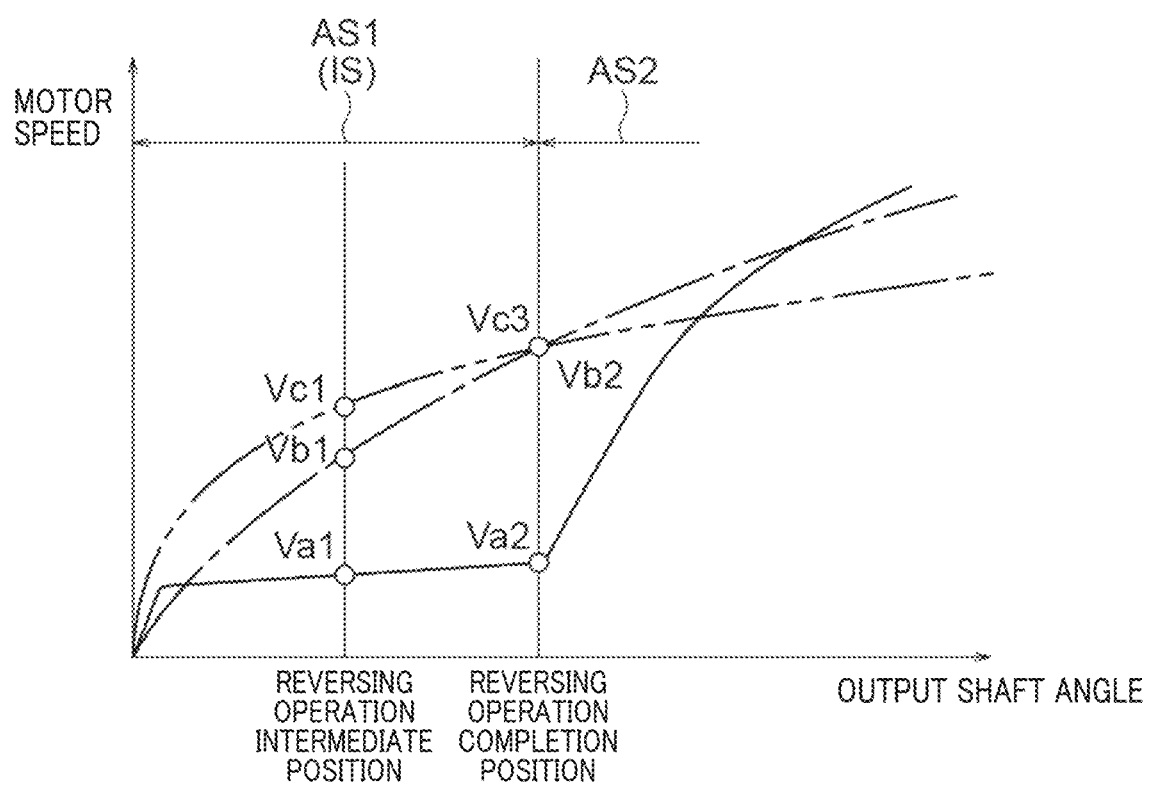
FIG. 10 is a line-graph in which a part of FIG. 8 is shown with a scale changed from FIG. 8.

Next, with reference to FIGS. 6 to 17, a rotation speed control of the wiper motor 18 performed by the wiper control circuit 60 will be described. FIG. 6 is a line-graph showing a relationship between a motor speed which is a rotation speed of the wiper motor and the time. FIG. 7 is a line-graph showing a part of FIG. 6 with a scale changed from FIG. 6. FIG. 8 is a line-graph showing a relationship between the motor speed and an angle formed with the output shaft 32. FIG. 9 is a line-graph showing a part of FIG. 7 with a scale changed from FIG. 7. FIG. 10 is a line-graph showing a part of FIG. 8 with a scale changed from FIG. 8. In FIG. 6 to FIG. 10, the solid line indicates an example of the rotation speed control of the wiper motor 18 according to the present embodiment. In FIG. 6 to FIG. 10, the two-dot chain line indicates an example of a rotation speed control of a wiper motor for a conventional vehicle wiper device in which the wiper motor is caused to reciprocally rotate (hereinafter referred to as first comparative example). Also, in FIGS. 7 and 10, the one-dot chain line indicates an example of a rotation speed control of the wiper motor which simply decreases the motor speed near the reversing position of the wiper according to a vehicle wiper device in which the wiper motor is caused to reciprocally rotate (hereinafter referred to as second comparative example). In FIGS. 9 and 10, respective points of Va1, Va2, Vb1, Vb2, Vc1 and Vc3 are mutually related.

According to the present embodiment, the wiper control circuit 60 is configured to perform, as indicated by the solid line in a line-graph shown in FIGS. 6 and 7, a rotation speed control to the wiper motor 18 including a first acceleration section AS1, a second acceleration section AS2 and a deceleration section DS. With this rotation speed control, the angle formed with the output shaft 32 of the wiper motor 18 changes as indicated by the solid line in FIG. 8. Since only the reversing directions of the wiper 14 and 16 are different between the upper reversing position P1 and the lower reversing position P2 and fundamental behaviors are the same, in the following description, the upper reversing position P1 and the lower reversing position P2 are simply referred to as reversing position P.

Figure 11:
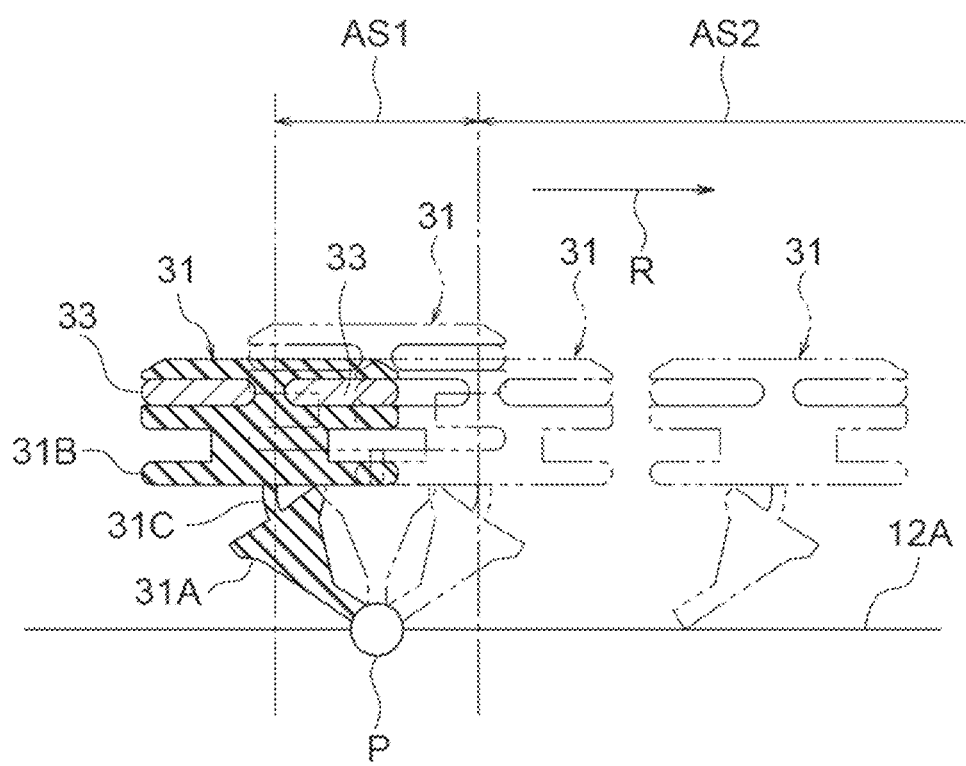
FIG. 11 is a cross-sectional view for explaining a first acceleration section and a second acceleration section.

As shown in FIG. 11, the first acceleration section AS1 is a section where a tilt direction of the lip part 31A of the blade rubber 31 changes when the movement direction of the wipers 14 and 16 is reversed at the reversing position P and the wiper motor 18 is caused to rotate at an extremely low speed. According to the present embodiment, in the first acceleration section AS1, the tilt direction of the lip part 31A is changed at an intermediate position in the longitudinal direction of the blade rubber 31. In more detail, according to the present embodiment, the blade rubber 31 of the wiper blade is formed longer than the blade rubber 31 of the wiper blade 28. Then, in the above-described first acceleration section AS1, the tilt direction of the lip part 31A is changed at an intermediate position in the longitudinal direction of the blade rubber 31 (i.e. blade rubber 31 of the wiper blade 30) which is the longest blade rubber among the above-described plurality of blade rubbers 31. The second acceleration section AS2 is a section subsequent to the first acceleration section AS1, where the rotation speed of the wiper motor 18 is accelerated to the maximum speed depending on the selected position of the wiper switch 66.

The deceleration section DS is a section subsequent to the second acceleration section AS2, where the rotation speed of the wiper motor 19 is decelerated to 0 from the above-described maximum speed. As shown in FIG. 8, the first acceleration section AS1 corresponds to a reversing operation section IS of the blade rubber 31, and the second acceleration section AS2 and the deceleration section DS are a wiping section WS of the wiped surface 12A to be wiped by the blade rubber 31. In the reversing operation section IS of the blade rubber 31, the blade rubber 31 does not wipe the wiped surface 12A.

The first acceleration section AS1 is a section where the blade rubber 31 reaches one reversing position P to start reversing and the lip part 31A of the blade rubber completes changing of the tilt direction. The first acceleration section AS1 may be set to be a section where the lip part 31A completes changing of the tilt direction thereof in the whole region in the longitudinal direction of the blade rubber 31 (whole region from tip end portion to rear end portion). In the first acceleration section AS1, the wiper control circuit 60 controls the motor speed to accelerate at a first average acceleration AC1 from 0 to a first speed V1 which is low speed. In more detail, the wiper control circuit 60 controls the motor speed which became 0 due to reversing of the rotation direction to rapidly accelerate to reach the first speed V1 which is a low speed, and restrains the acceleration of the motor speed. Specifically, the wiper control circuit 60 rapidly accelerates the motor speed from 0 to the first speed V1 which is an extremely low speed in a first rapid acceleration part, and then maintains the motor speed to be constant or substantially constant in a first constant speed part. In other words, when the tilt direction of the lip part 31A is changed, the blade rubber 31 moves in the vertical direction with respect to the wiped surface 12A, In this respect, the wiper control circuit 60 controls the motor speed in the first acceleration section AS1 to be the first speed V1 which is an extremely low speed or substantially the same speed such that kinetic energy caused by the movement is small as much as possible. However, in order to prevent passengers from feeling the stop period to be longer when reversing of the wipers 14 and 16, the motor speed is controlled to be rapidly accelerated until it reaches the first speed V1. Hence, in FIGS. 6 to 10, the line graph with the solid line showing the present embodiment has a step shape having one step or a shape approximated to the step shape having a bending portion BP1 (reference number is omitted in the drawings except FIG. 6) projecting upwardly.

In the above-described first acceleration section AS1, since the tilt direction of the lip part 31A of the blade rubber 31 is changed at extremely low speed, the reversing sound caused by the change in the tilt direction can be effectively reduced. In the case where the horizontal axis is the time as shown in FIGS. 7 and 9, it seems that a reduction effect of the reversing sound is present even in the second comparative example in which the motor speed is simply decreased at the reversing position. However, when the horizontal axis converted to an angle axis of the output shaft 32 as shown in FIGS. 8 and 10, according to the second comparative example, since the motor speed in the reversing operation section IS is not sufficiently decreased, the reduction effect of the reversing sound is low. According to the present embodiment, the motor speed is rapidly accelerated at the beginning of the first acceleration section AS1, whereby the motor speed at the reversing-operation intermediate position and the reversing completion position shown in FIG. 10 can be significantly lowered. That is, as shown in in FIG. 10, the motor speed Va1, Va2 according to the present embodiment is significantly lowered compared to the motor speed Vb1 and Vb2 according to the second comparative example. Thus, according to the present embodiment, a reduction effect of the reversing sound is extremely high.

In the second acceleration section AS2 subsequent to the first acceleration section AS1, the wiper control circuit 60 rapidly increases the motor speed to reach the second speed V2 which is higher than the first speed. V1 (second rapid acceleration part). In the first half of the second acceleration section AS2, the wiper control circuit 60 controls the motor speed to reach speed 112 V2 which is higher than the first speed V1 and ½ times of the second speed V2 at a second average acceleration AC2 which is twice or more of the first average acceleration AC1. Hence, in FIGS. 6 to 10, the line graph with the solid line showing the present embodiment is formed in a shape having a bending portion BP2 (reference number is omitted in the drawings except FIG. 6) projecting downwardly at a boundary between the first acceleration section AS1 and the second acceleration AS2. The above-described speed V2 is set to be the maximum speed in accordance with the selected position (LO, HI or INT) of the wiper switch 66 or a speed close to the maximum speed. Also, according to the present embodiment, as an example, the wiper control circuit 60 rapidly accelerates the motor speed in the second acceleration section AS2 to reach the second speed V2, then suppresses the acceleration such that the motor speed is maintained at constant speed of the second speed V2 (second constant speed part). Hence, in FIGS. 6 to 8, the line graph with the solid line showing the present embodiment has a step shape having one step or a shape approximated to the step shape in the second acceleration section AS2. Accordingly, in FIGS. 6 to 8, the line graph with the solid line showing the present embodiment has a step shape having two steps or a shape approximated to the step shape as a whole of the first acceleration section AS1 and the second acceleration section AS2.

Figure 12:
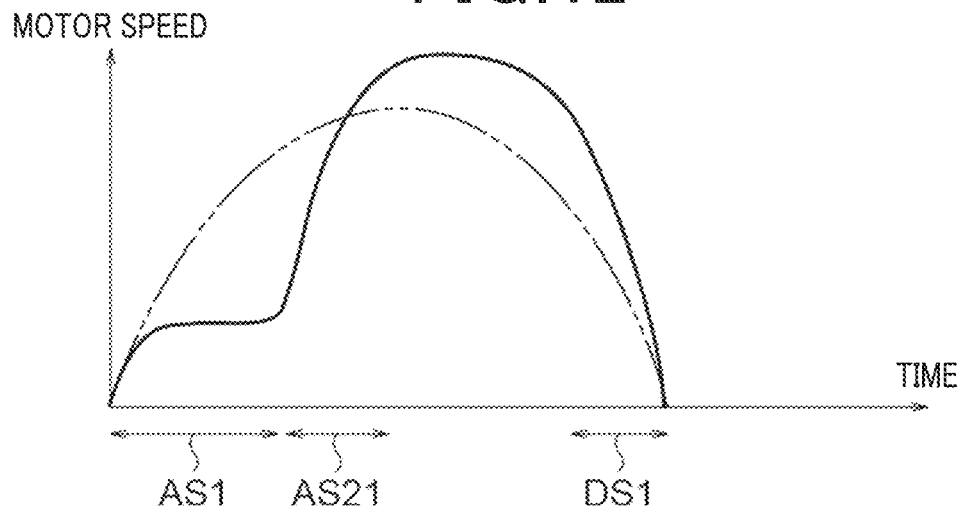
FIG. 12 is a line-graph showing a relationship between the rotation speed of the wiper motor and the time
Figure 13:
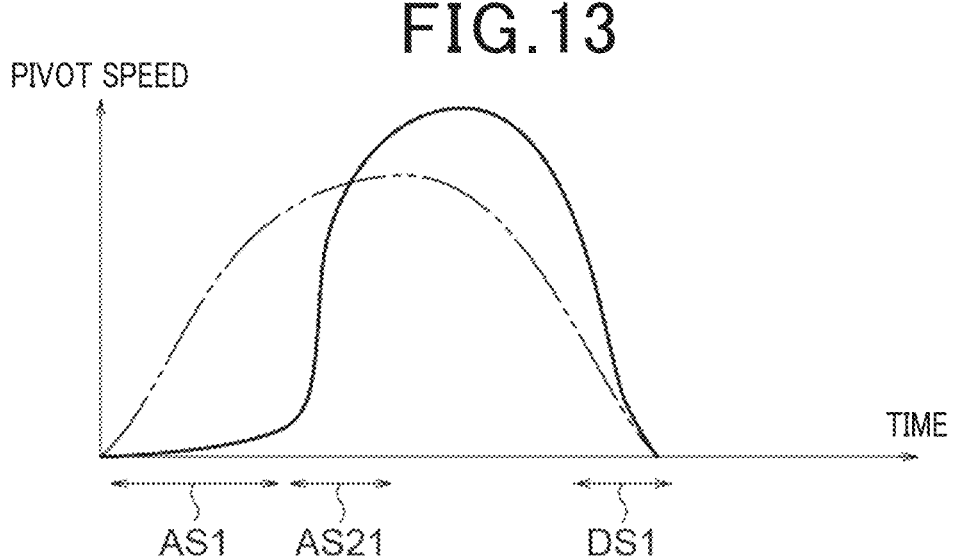
FIG. 13 is a line-graph showing a relationship between a rotation speed of a pivot axis and the time.
Figure 14:
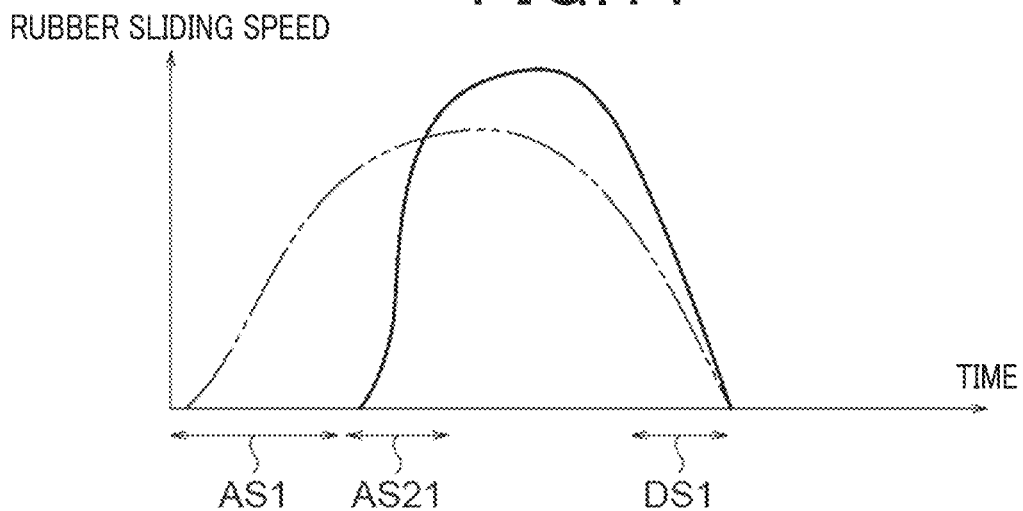
FIG. 14 is a line-graph showing a relationship between a sliding speed (moving speed) of a blade rubber on a surface to be wiped (i.e. wiped surface)

In the deceleration section DS subsequent to the second acceleration section AS2, the wiper control circuit 60 controls the motor speed which is increased to be at the maximum speed, to be decelerated to reach 0. According to the present embodiment, as an example, the wiper control circuit 60 rapidly decelerates the motor speed to be at 0 in the second half of the deceleration section DS. Specifically, the wiper control circuit 60 maintains the motor speed to be the above-described maximum speed or the similar speed in the deceleration section DS for a constant period, then controls the motor speed to be rapidly decelerated to 0. In the second half of the deceleration section DS, the wiper control circuit 60 controls the motor speed to be rapidly decelerated from speed ½ V2 which is ½ times of the second speed V2 to 0 at a second average acceleration AC2 which is twice or more of the first average acceleration AC1. Note that the end point of the deceleration section DS and a point at which the motor speed is 0 refers to a point where the blade rubber 31 reaches the other reversing position and a starting point of the subsequent first acceleration section AS1. As shown in FIG. 12, it may be configured such that the motor speed is smoothly changed in the first acceleration section AS1, the second acceleration section AS2 and the deceleration section DS Hereinafter, with reference to FIGS. 12 to 14 as an example, a relationship between the motor speed, the rotation speed of the pivot shaft (hereinafter referred to as pivot speed) and a sliding speed of the blade rubber 31 with respect to the wiped surface 12A (hereinafter referred to as rubber sliding speed) according to the present embodiment will be described. When the motor speed is controlled as indicated by the solid line in FIG. 12, a relationship between the pivot speed and the time is indicated by the solid line in FIG. 13, and a relationship between the rubber sliding speed and the time is indicated by the solid line in FIG. 14. Note that the two-dot chain line in FIGS. 12 to 14 shows a case of the above-described first comparative example.

Figure 15A:
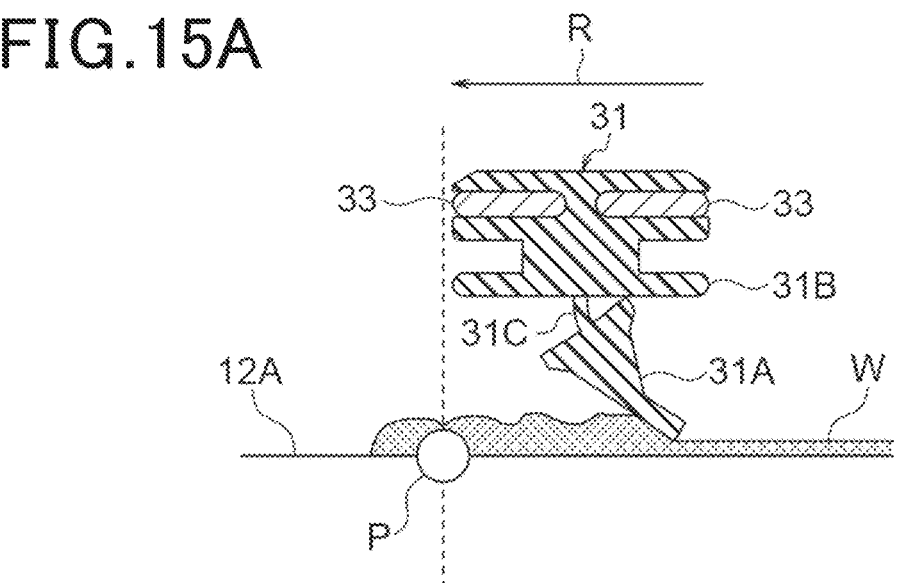
FIG. 15A is a cross-sectional view showing a blade rubber immediately before reaching one reversing position.

According to the present embodiment, the motor speed is rapidly decelerated in the second half of the deceleration section DS (see section labeled by DS1 in FIG. 12). In the second half of the deceleration section DS, the pivot speed and the rubber sliding speed is rapidly decelerated (see section labeled by DS1 in FIGS. 13 and 14). Thus, as shown in FIG. 15A, the blade rubber 31 immediately before reaching one reversing position P is maintained at a state where the frictional coefficient to the wiped surface 12A is low. As a result, a chattering phenomenon of the blade rubber 31 caused by the blade rubber 31 sliding on the wiped surface 12A at a low speed is suppressed. Note that 'W' shown in FIGS. 15A to 15F, refers to rain water.

Figure 15B:
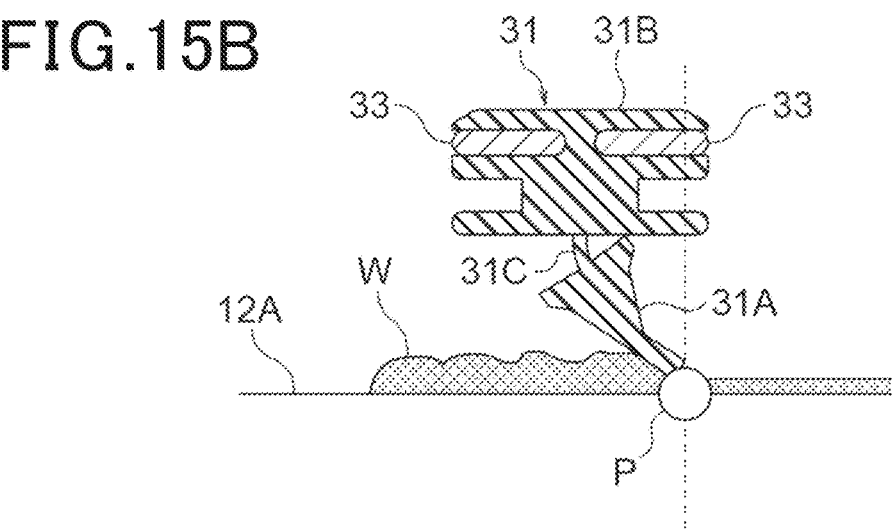
FIG. 15B is a cross-sectional view showing a blade rubber when reaching one reversing position.
Figure 15C:
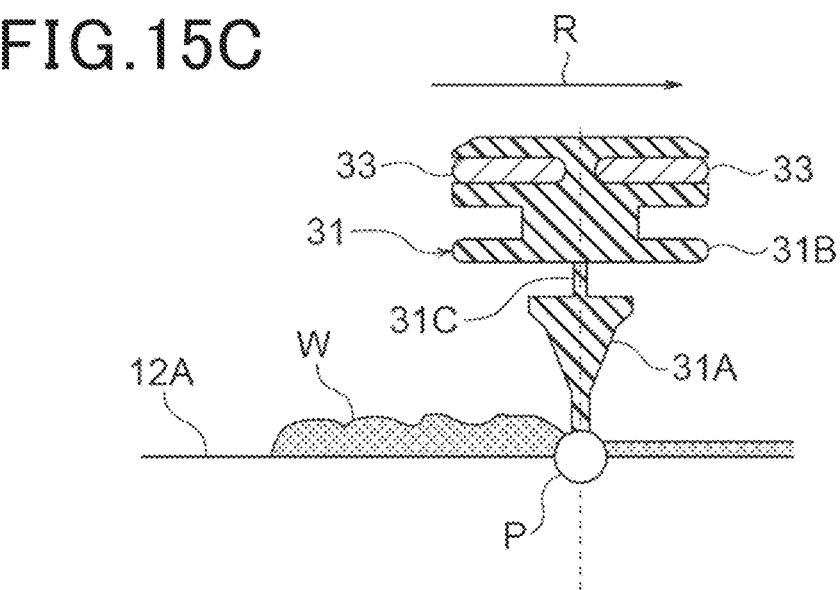
FIG. 15C is a cross-sectional view showing a blade rubber in the middle of reversing at one reversing position.
Figure 15D:
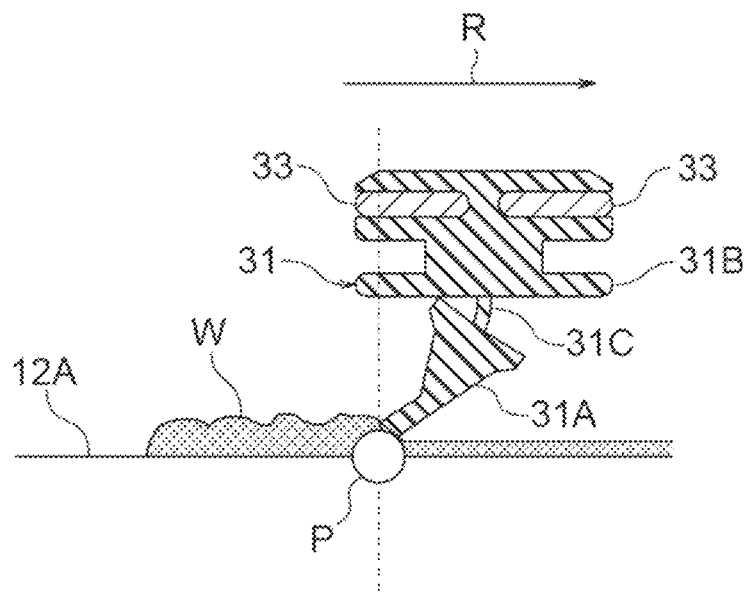
FIG. 15D is a cross-sectional view showing a blade rubber immediately after reversing is completed at one reversing position.

In the first acceleration section AS1, the motor speed is rapidly accelerated to reach the first speed V1 which is extremely low speed and then the acceleration of the motor speed is restrained (see section labelled by AS1 FIG. 12). In the first acceleration section AS1, the pivot speed is maintained at extremely low speed while the rubber sliding speed is maintained at 0 (see section labelled by AS1 in FIGS. 13 and 14). Thus, as shown in FIGS. 15B to 15D, since the tilt direction of the lip part 31A of the blade rubber 31 is changed at extremely low speed, the kinetic energy of the blade rubber 31 in the vertical direction with respect to the wiped surface 12A, that is, the kinetic energy which causes vibration (chattering phenomenon), is unlikely to occur.

Figure 15E:
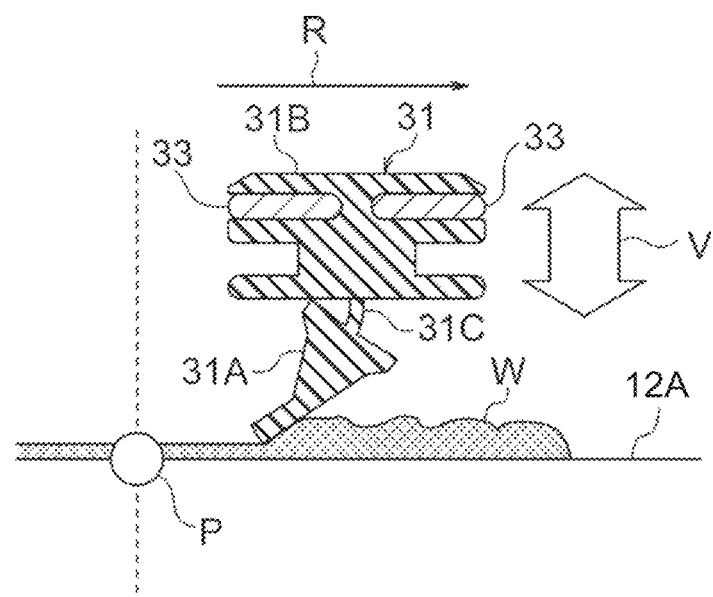
FIG. 15E is a cross-sectional view showing a cross-sectional view of a blade rubber moving away from one reversing position.

In the first half of the second acceleration section AS2, the motor speed is rapidly accelerated to the second speed V2 from the first speed V1 (see section labelled by AS21 in FIG. 12). In the first half of the second acceleration section AS2, the pivot speed and the rubber sliding speed are rapidly accelerated (see section labelled by AS21 in FIGS. 13 and 14). Thus, as shown in FIG. 15E, since it is in the tilted position where the tilt direction of the lip part 31A of the blade rubber 31 is already completed to be changed, the motor speed is rapidly accelerated while suppressing a vibration V in the vertical direction with respect to the wiped surface 12A. With this rapid acceleration, the frictional coefficient of the blade rubber 31 with respect to the wiped surface 12A becomes low, and the chattering phenomenon of the blade rubber 31 is suppressed.

Figure 16:
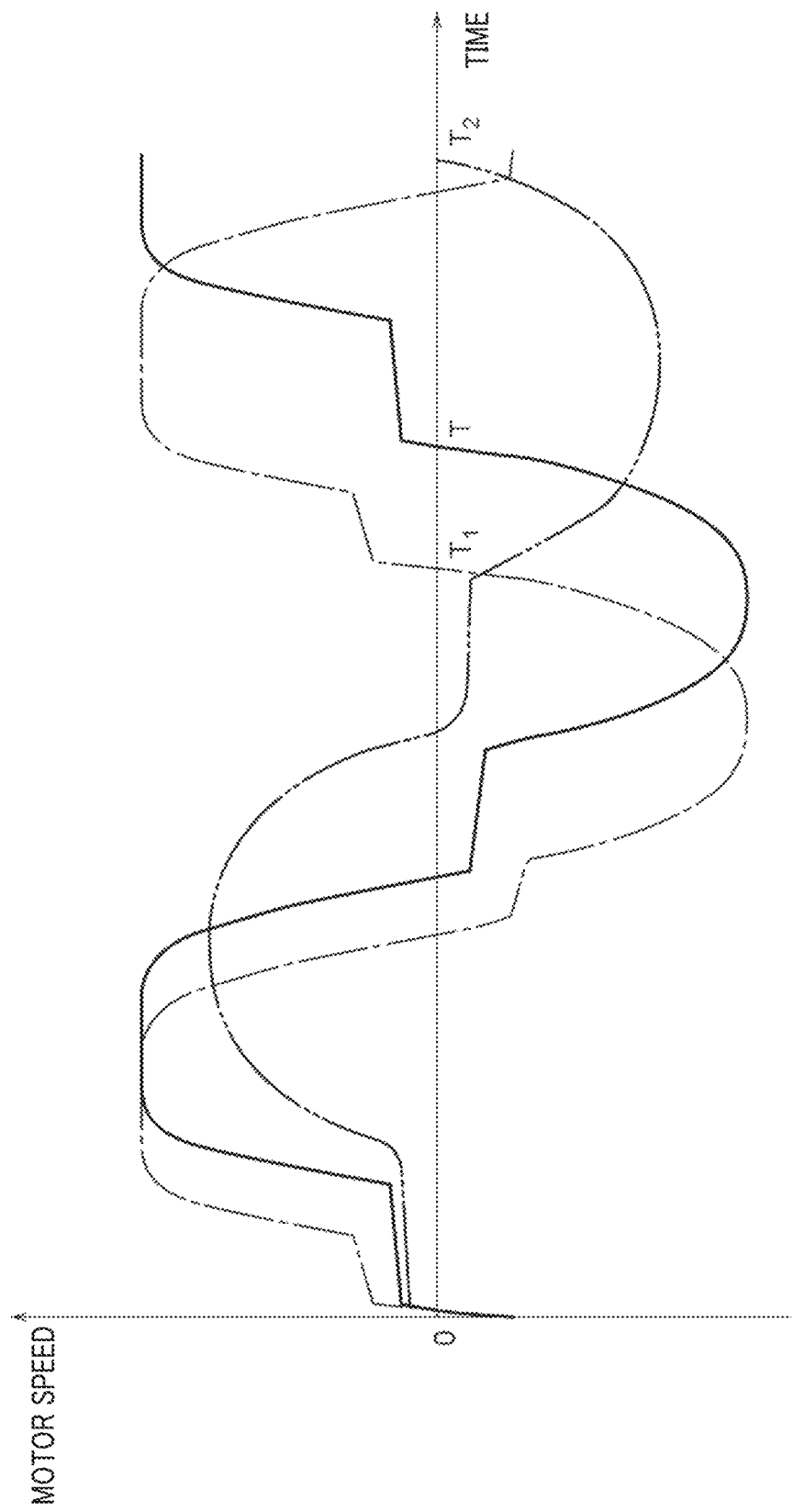
FIG. 16 is a line-graph showing a relationship between the rotation speed of the wiper motor and the time, and showing an example for changing the rotation speed of the wiper motor based on a detection result of a rain sensor and a vehicle speed sensor.

Further, according to the present embodiment, the wiper control circuit 60 changes (fine adjustment) the motor speed in the first acceleration section AS1 and the second acceleration section AS2 based on wiping information selected by the wiper switch 66, rainfall information detected by the rain sensor 67 and the vehicle speed information detected by the vehicle speed sensor 68 (i.e. road noise information as an environmental sound), In FIG. 16, an example of the change control of the motor speed is shown by a line-graph.

According to an example shown in FIG. 16, when the wiper switch 66 is positioned at a low speed operation selected position (LO), the wiper control circuit 60, the wiper control circuit 60 changes the motor speed between three steps LO+, LO, LO−) based on the detection result of the rain sensor 67 and the vehicle speed sensor 68. Thus, the number of wipes (cpm) during the mode is adjusted depending on the situation.

Specifically, in the case where an amount of rainfall is large or a road noise environmental sound is large, since a passenger in the vehicle is unlikely to notice a sound caused by a wiper operation because of a so-called masking effect, the wiper control circuit 60 increases the motor speed and sets the wiping speed to be higher.

Specifically, according to the example shown in FIG. 16, when an amount of rainfall is large and the vehicle is travelling at high speed, the wiper control circuit 60 sets the mode to be LO+ indicated by the one-dot chain line in FIG. 16. In this LO+ mode, the motor speed is increased in the first acceleration section AS1 and the wiping speed becomes higher. On the other hand, in the case where the vehicle is travelling at low speed or the vehicle is stopped when an amount of rainfall is large, the wiper control circuit 60 sets the mode to be LO mode indicated by the solid line shown in FIG. 16. In the LO mode, the motor speed is decreased comparted to a case of the LO+ mode and the wiping speed becomes low. On the other hand, in the case where the vehicle is stopped when an amount of rainfall is small, the wiper control circuit 60 sets the mode to be LO− mode indicated by two-dot chain line in FIG. 16. In the LO− mode, the motor speed in the first acceleration speed AS1 is lower than that of the LO mode and the wiping speed becomes low. The wiping period $T_1$ of LO+ mode is shorter than the wiping period T in the LO mode, and the wiping period $T_2$ in the LO− mode is longer than the wiping period T of the LO mode.

Figure 17:
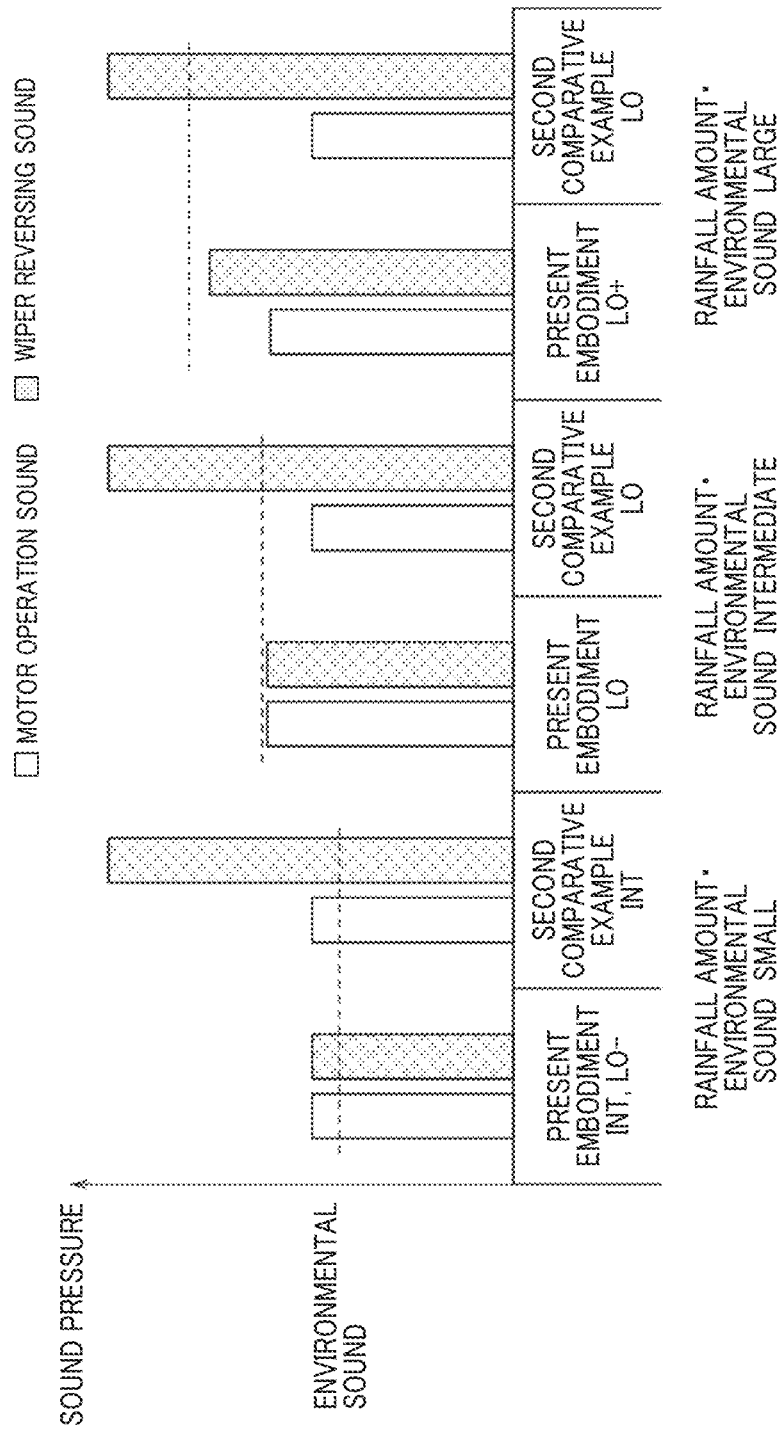
FIG. 17 is a bar graph in which a noise level of the first embodiment and a noise level of a conventional configuration are compared.

FIG. 17 is a bar graph showing a comparison of the noise level between the present embodiment and the above-described second comparative example (see one-dot chain line in FIGS. 7 and 8). In FIG. 17, the dotted line indicates an amount of the environmental sound. In the case where an amount of rainfall is small and the environmental sound is small, a sound pressure of the wiper reversing sound is high compared to a sound pressure of the motor operation sound in the INT mode of the second comparative example. However, according to the present embodiment, the sound pressure of the wiper reversing sound in the INT mode and the LO− mode is low compared to that of the second comparative example. This is because, when simply setting the motor speed to be low around the wiper reversing position similar to the second comparative example, since a chattering phenomenon of the blade rubber occurs, the wiper reversing sound cannot be sufficiently lowered. According to the second comparative example, for example, an intermittent time may be adjusted, thereby adjusting the noise.

On the other hand, in the case where the amount of rainfall and the environmental sound are in a middle level, in the LO mode of the second comparative example, a sound pressure of the wiper reversing sound is high compared to a sound pressure of the motor operation sound in the LO mode of the second comparative example. In the LO mode according to the present embodiment, although the sound pressure of the motor operation sound is slightly higher than that of the second comparative example, the sound pressure of the wiper reversing sound is sufficiently low compared to that of the second comparative example. Thus, the sound pressure of the motor operation sound and the sound pressure of the wiper reversing sound are appropriately balanced, and the noise level is lowered as a whole.

Further, in the case where an amount of rain fall is large and the environmental sound is large, a sound pressure of the wiper reversing sound is high compared to a sound pressure of the motor operation sound in the LO mode of the second comparative example. In the LO+ mode of the present embodiment, the sound pressure of the motor operation sound and the wiper reversing sound is slightly higher than that of the second comparative example. This is because, since the masking effect can be obtained in this situation, according to the present embodiment, the number of wipes (cpm) is increased when an amount of rainfall is larger while lowering the reduction effect of the wiper reversing effect.

Summary of Present Embodiment

According to the present embodiment, in the first acceleration section AS1 where the tilt direction of the lip part 31A of the blade rubber 31 is changed, the motor speed is rapidly accelerated to the first speed V1 (extremely low speed in this case) from 0 and then, the acceleration of the motor speed is restrained. With this rapid acceleration to the first speed V1, passengers can be prevented from feeling the stop period to be longer when reversing of the wipers 14 and 16. Moreover, an acceleration is restrained when the above-described speed V1 is set before reaching the second acceleration section AS2, thereby reducing the reversing sound caused by the above-described change. Further, in the second acceleration section AS2 subsequent to the first acceleration section AS1, the motor speed is rapidly accelerated to reach the second speed V2 which is higher than the first speed V1. With this rapid acceleration to the second speed V2, since the frictional coefficient of the blade rubber 31 with respect to the wiped surface 12A becomes low, the chattering phenomenon of the blade rubber 31 can be suppressed.

Further, since the wiper motor 18 is configured to be reciprocally rotated, comparing a configuration in which unidirectional rotation movement of the wiper motor into a reciprocating rotational movement of the wiper, the link mechanism can be removed and an operation space can be reduced. Hence, a mountability to the vehicle can be improved. Also, since the wiping angle of the wiper 14 and 16 can be adjusted by a rotation control of the wiper motor 18, an overrun or a short-run of the wiper blades 28 and 30 can readily be suppressed. Furthermore, the storage position P3 of the wipers 14 and 16 can be readily set to lower position.

Further, according to the present embodiment, in the second half of the deceleration section DS, the motor speed is rapidly decelerated. Thus, the blade rubber 31 immediately before reaching the reversing position is maintained at a state where the frictional coefficient is low with respect to the wiped surface 12A. As a result, chattering phenomenon of the blade rubber 31, which occurs when the blade rubber 31 slides on the wiped surface 12A at a low speed, can be suppressed.

Also, according to the present embodiment, in the first acceleration section AS1, the motor speed is caused to be rapidly accelerated to reach the first speed V1 which is low speed and then restrains the acceleration of the motor speed, thereby controlling the motor speed to be constant or substantially constant. Thus, since the motor speed is maintained at a low speed when the tilt direction of the lip part 31A changes, a reversing sound due to the change in the tilt direction can be effectively reduced. Further, the motor speed is maintained constant or substantially constant, whereby the rotation speed of the output shaft 32 at the end point of the first acceleration section AS1 is accurately detected. Hence, it is possible to detect the motor speed accurately.

Further, according to the present embodiment, the motor speed is changed in the first acceleration section AS1, the second acceleration section AS2 and the deceleration section DS based on the wiping information selected by the wiper switch 66, the rainfall information detected by the rain sensor 67 and the vehicle speed information detected by the vehicle speed sensor 68. Thus, the wiping speed can be optimized depending on an amount of rainfall or the road noise (environmental sound). As a result, the passenger during vehicle travelling can be prevented from experiencing discomfort on the sight and the motor operation sound and the wiper reversing sound can be optimally balanced.

Next, other embodiments of the present disclosure will be described. For substantially the same configurations, effects and advantages as those in the embodiments which are already described, the same reference symbols as those in the already described embodiments will be applied, and the explanation thereof will be omitted.

Second Embodiment

Figure 18:
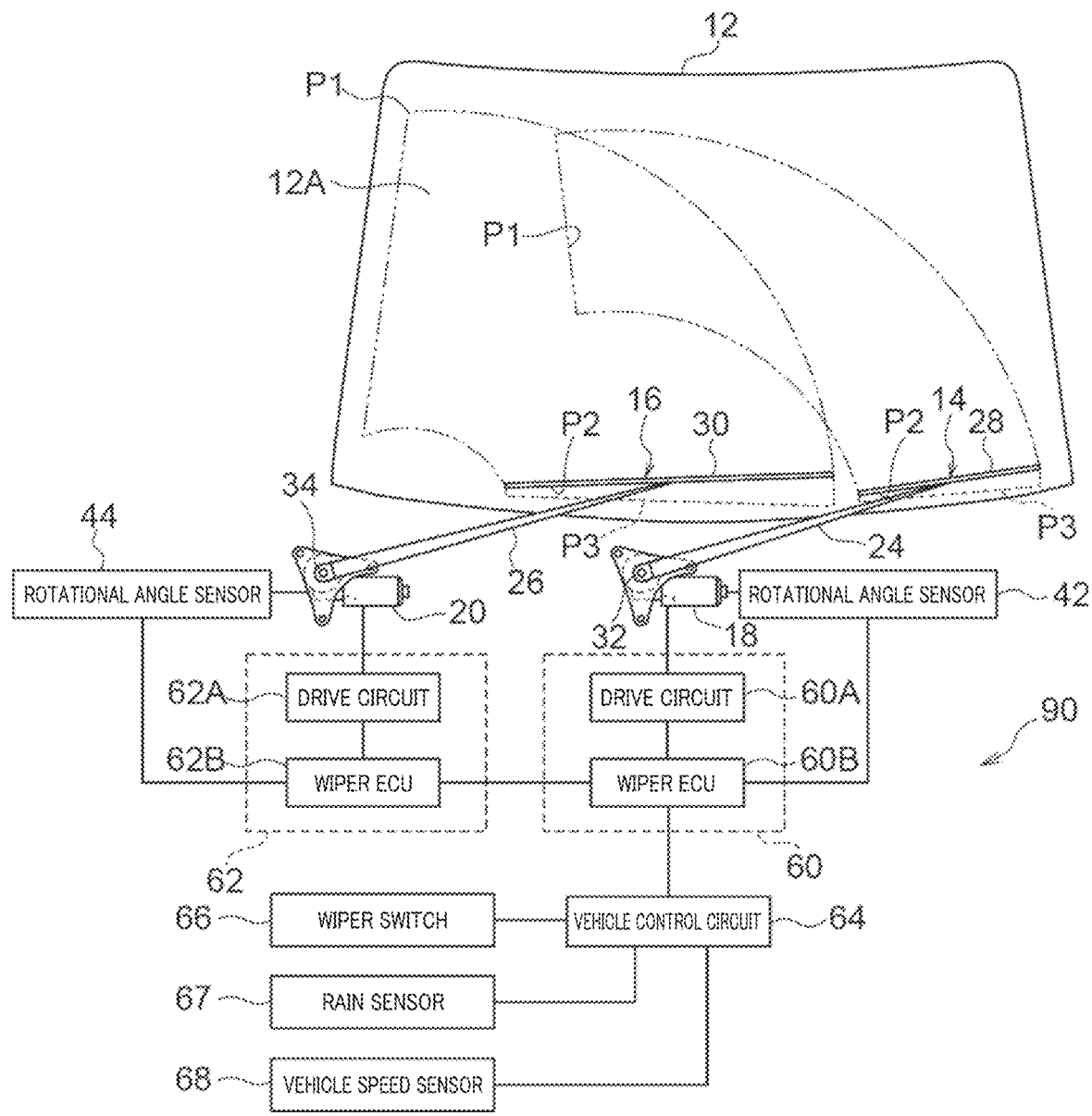
FIG. 18 is an overall diagram showing a configuration of a vehicle wiper device according to a second embodiment.

FIG. 18 is an overall diagram showing a configuration of a vehicle wiper device 90 according to a second embodiment of the present disclosure, According to the vehicle wiper device 90, the left and right wipers 14 and 16 are driven by individual wiper motors 18 and 20 to be reciprocally rotated. One end portion of the wiper arm 24 in the longitudinal direction of the wiper 14 is fixed to the output shaft 32 of the wiper motor 18, and one end portion of the wiper arm 26 in the longitudinal direction of the wiper 16 is fixed to the output shaft 34 of the wiper motor 20.

The wiper control circuits 60 and 62 are connected to the wiper motors 18 and 20, respectively for controlling the wiper motors 18 and 20. The wiper control circuit 60 includes the drive circuit 60A and the wiper ECU 60B. The wiper control circuit 62 includes the drive circuit 62A and the wiper ECU 62B. The rotational angle sensor 42 that detects the rotation speed and the rotational angle of the output shaft 32 of the wiper motor 18 is connected to the wiper ECU 60B. The rotational angle sensor 44 that detects the rotation speed and the rotational angle of the output shaft 34 of the wiper motor 20 is connected to the wiper ECU 62B, The drive circuit 62A, the wiper ECU 62B and the rotational angle sensor 44 are configured similarly to the drive circuit 60A, the wiper ECU 60B and the rotational angle sensor 42.

The wiper ECU 60B and the wiper ECU 62B are cooperated with each other by a communication using a protocol such as LIN (local interconnect network), thereby synchronizing operations between the wiper motors 18 and 20. Thus, the rotation speed of the wiper motors 18 and 20 are controlled similar to the first embodiment. According to the present embodiment, configurations other than the above-described configurations are similar to those in the first embodiment. Thus, also with this embodiment, effects and advantages similar to those of first embodiment can be obtained. Further, according to the present embodiment, since the link mechanism 22 is unnecessary, the mountability to the vehicle can be further improved.

Third Embodiment

Figure 19:
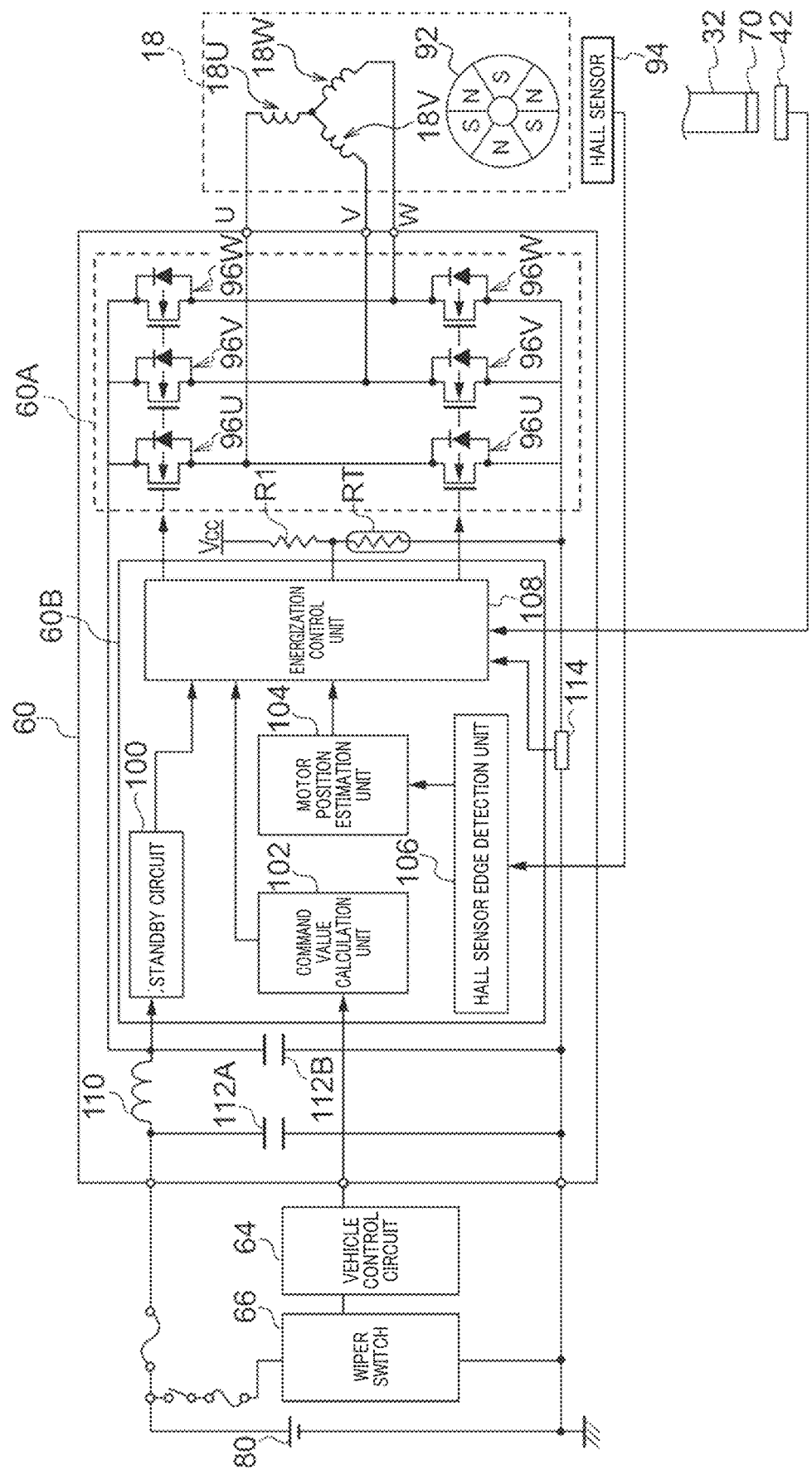
FIG. 19 is a block diagram showing a partial configuration of the vehicle wiper device according to a third embodiment.

FIG. 19 is a block diagram showing a partial configuration of a vehicle wiper device according to a third embodiment of the present disclosure. According to the present embodiment, the wiper motor 18 is configured as a brush-less motor and a configuration of the wiper control circuit 60 is different from that of the first embodiment. The wiper control circuit 60 includes a drive circuit 60A that generates voltage applied to terminals of the stator coils 18U, 18V and 18W of the wiper motor 18 and a wiper ECU 60B that controls the switching elements constituting the drive circuit 60A.

A rotor 92 of the wiper motor 18 is configured of permanent magnets having 3 S-pole magnets and 3 N-pole magnets, and configured to rotate to follow the rotational magnetic field produced at the coils of the stator. The magnetic field of the rotor 92 is detected by a Hall sensor 94. The Hall sensor 94 may detect the magnetic field of a sensor magnet provided separately from the rotor 92 corresponding to the polarities of the permanent magnet of the rotor 92. The Hall sensor 94 detects the magnetic field of the rotor 92 or the sensor magnet as a magnetic field showing the location of the rotor 92.

The Hall sensor 94 detects the magnetic field produced by the rotor 92 or the sensor magnet, thereby detecting the position of the rotor 92. The Hall sensor 94 includes three Hall elements corresponding to respective phases U, V, and W. The Hall sensor 94 outputs a change in the magnetic field produced by the rotation of the rotor 92 to be a voltage change signal which is approximated to sinusoidal waves.

The signal outputted by the Hall sensor 94 is transmitted to the wiper ECU 60B as a control circuit. The wiper ECU 60B is configured as an integrated circuit and the power supplied from the battery 80 as a power source is controlled by a standby circuit 100.

An analog waveform signal transmitted to the wiper ECU 60B from the Hall sensor 94 is transmitted to a Hall sensor edge detection unit 106 disposed in the wiper ECU 60B, including a circuit converting an analog signal to a digital signal such as a comparator. The Hall sensor edge detection unit 106 converts the received analog waveform to be a digital waveform and detects an edge part from the digital waveform.

The digital waveform and the edge information are transmitted to a motor position estimation unit 104 and the position of the rotor 92 is calculated. The positional information of the rotor 92 is transmitted to an energization control unit 108.

Further, a signal for commanding the rotation speed of the wiper motor 18 (i.e. rotor 92) is transmitted to a command value calculation unit 102 of the wiper ECU 60B from the wiper switch 66. The command value calculation unit 102 extracts a command related to the rotation speed of the wiper motor 18 from the signal transmitted from the wiper switch 66 and transmits the extracted signal to the energization control unit 108.

The energization control unit 108 calculates a phase of the voltage being changed depending on the position of the magnetic pole of the rotor 92 calculated by the motor position estimation unit 104, and determines a drive duty value based on the calculated phase and the rotation speed of the rotor 92 commanded by the wiper switch 66, Further, the energization control unit 108 generates a PWM signal as a pulse signal depending on the drive duty and outputs the PWM signal to the drive circuit 60A, thereby performing a PWM control. With this PWM control, the drive circuit 60A generates a voltage changing at a timing in accordance with the position of the magnetic pole of the rotor 92, and applies the voltage to coils 18U, 18V and 18W of the stator 18. In the coils 18U, 18V and 18W to which the above voltage is applied, rotational magnetic field is produced to rotate the rotor 92.

The drive circuit 60A is configured of a three-phase (U-phase, V-phase and W-phase) inverter. As shown in FIG. 19, the drive circuit 60A is provided with three N-channel field effect transistors (MOSFETs) 96U, 96V, and 96W each configured as upper-stage switching element (hereinafter referred to as FET 96U, 96V and 96W), and three N-channel field effect transistors (MOSFETs) 98U, 98V, and 98W each configured as lower-stage switching element (hereinafter referred to as FET 98U, 98V and 98W). Note that FET 96U, 96V and 96W, and FET 98U, 98V and 98W are collectively referred to as FET 96 and FET 98, respectively when it is not necessary to identify respective FETs, and when it is necessary to identify them, the respective FETs are labelled by U, V, and W.

In the FET 96 and FET 98, the source of the ITT 96U and the drain of the FET 98U are connected to a terminal of the coil 18U, the source of the FET 96V and the drain of the FET 98V are connected to a terminal of the coil 18V, and the source of the FET 96W and the drain of the FET 98W are connected to a terminal of the coil 18W.

The gates of the FET 96 and the FET 98 are connected to the energization control unit 108 and the PWM signal is transmitted to the gates of the FET 96 and the FET 98. The FET 96 and the FET 98 turn ON when an H level PWM signal is transmitted to the gates thereof, and current flows from the drain to the source. Further, when an L level PWM signal is transmitted to the gates thereof, current does not flow from the drain to the source.

Further, according to the wiper control circuit 60 of the present embodiment, a battery 80, a noise prevention coil 110 and smoothing capacitors 112A and 112B are provided. The battery 80, the noise prevention coil 110 and the smoothing capacitors 112A and 1121 substantially constitute a DC power source.

Moreover, a chip thermistor RT is mounted on a substrate of the wiper control circuit 60 according to the present embodiment. The chip thermistor RT detects the temperature of the substrate as a resistance value. The one end of the chip thermistor is applied with a control voltage Vcc via a resistor R1 and the other end thereof is ground on the substrate. The chip thermistor RT used for the present embodiment is configured as a NTC (negative temperature coefficient) thermistor in which the resistance decreases as the temperature increases. That is, the resistance value of the chip thermistor RT decreases as the temperature increases. Note that an inverting circuit may be provided to use a PTC (positive temperature coefficient) thermistor in which the resistance value increases as the temperature increases.

The chip thermistor RT and the resistor R1 constitutes a voltage divider where a voltage that changes based on the resistance value of the chip thermistor RT is outputted from one end of the chip thermistor RT connected to the resistor R1. The voltage outputted from the one end of the chip thermistor RT is compared with an overheat determination value at the energization control unit 108. When determined that the voltage outputted from the one end of the chip thermistor RT is smaller than or equal to the overheat determination value, the wiper control circuit 60 is determined to be in an overheating state. As described above, since the chip thermistor RT according to the present embodiment is a NTC thermistor in which the resistance decreases as the temperature increases, the voltage outputted from the one end of the chip thermistor RT which is the output end of the voltage divider constituted of the resistor R1 and the chip thermistor RT, decreases as the temperature increases. The energization control unit 108 determines that the circuit is in an overheating state when the voltage outputted from one end of the chip thermistor RT is smaller than or equal to the overheat determination value. The overheat determination value changes depending on the locations of the elements and the chip thermistor RT mounted on the substrate. As an example, the overheat determination value is a voltage outputted by the voltage divider composed of the chip thermistor RT and the resistor R1 at 145° C.

Further, a current detection unit 114 is provided between respective sources of the FET 98U, 98V and 98W and the battery 80. The current detection unit 114 is composed of a shunt resistor having resistance value from 0.2 mΩ to several Ω and an amplifier that amplifies a potential difference between both ends of the shunt resistor and outputs voltage value proportional to the current flowing through the shunt resistor.

The signal outputted by the amplifier is transmitted to the energization control unit 108. The energization control unit 108 compares the signal outputted by the current detection unit 114 with the over current determination value and determines that the motor current is in an overcurrent state when determined that the output signal of the current detection unit 114 is larger than or equal to the over current determination value. Although it is not illustrated in FIG. 19, a voltage sensor and the like for detecting the voltage of the battery 80 is mounted on the wiper control circuit 60. According to the present embodiment, configurations other than the above-described configurations are similar to those in the first embodiment. Also with this embodiment, effects and advantages similar to those of first embodiment can be obtained.

Fourth Embodiment

Figure 20:
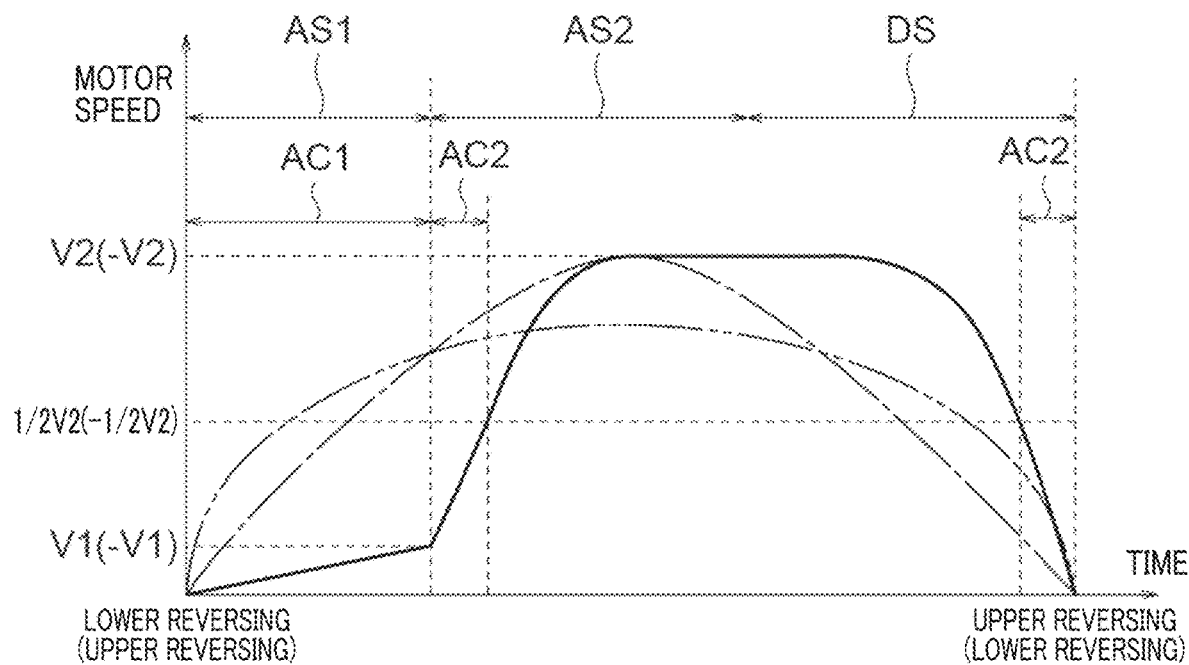
FIG. 20 is a line-graph showing a relationship between the rotation speed of the wiper motor of a vehicle wiper device according to a fourth embodiment and the time.
Figure 21:
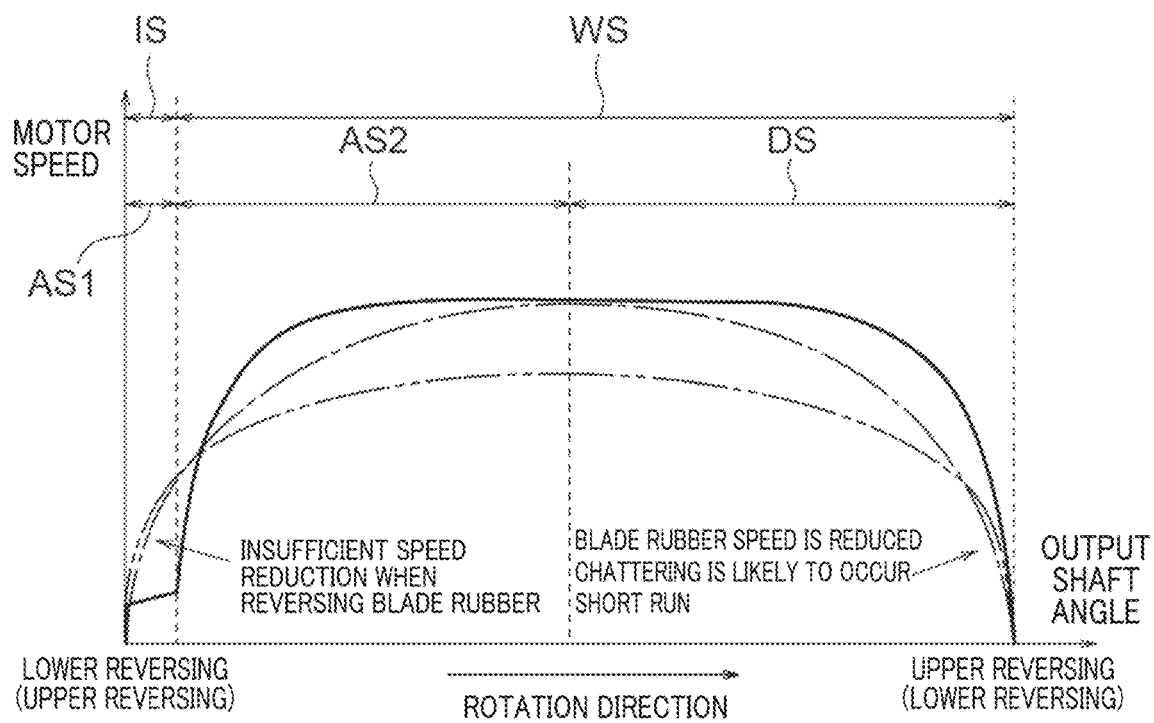
FIG. 21 a line-graph corresponding to FIG. 8 showing a relationship between the rotation speed of a wiper motor of a vehicle wiper device and an angle of the output shaft according to the fourth embodiment.

FIG. 20 is a line-graph showing a relationship between the motor speed of a vehicle wiper device according to a fourth embodiment and the time. FIG. 21 is a line-graph showing a relationship between the motor speed of the vehicle wiper device and an angle of the output shaft according to the fourth embodiment. According to the present embodiment, similar to the first embodiment, the wiper control circuit 60 accelerates the motor speed in the first acceleration section AS1 from 0 to the first speed V1 which is low speed to reach the first average acceleration AC1. However, unlike the first embodiment, the wiper control circuit 60 according to the fourth embodiment does not rapidly accelerate the motor speed from 0 to the first speed V1 in the first acceleration section AS1 and does not restrain the acceleration of the motor speed afterward. The wiper control circuit 60 according to the fourth embodiment accelerates the motor speed from 0 to the first speed V1 at a substantially constant acceleration.

Further, according to the present embodiment, similar to the first embodiment, the wiper control circuit 60 controls, in the first half of the second acceleration section AS2, the motor speed to reach the speed ½ V2 which is higher than the first speed V1 and ½ times of the second speed V2 at the second average acceleration AC2 which is twice or more of the first average acceleration AC1. For the deceleration section DS, similar to the first embodiment, the wiper control circuit 60 controls, in the second half of the deceleration section DS, the motor speed to be rapidly decelerated from the speed ½ V2 which is ½ times of the second speed V2 to 0 at the second average acceleration AC2 which is twice or more of the first average acceleration AC1.

Also, with the present embodiment, the first speed V1 is set to be a low speed, whereby the reversing sound caused by the change in the tilt direction can be reduced. Moreover, in the second acceleration section AS2, the motor speed is accelerated to speed ½ V2 which is ½ times of the second speed V2 at the second average acceleration AC2 which is twice or more of the first average acceleration AC1. With this acceleration to the speed ½ V2, since the frictional coefficient of the blade rubber 31 with respect to the wiped surface becomes low, the chattering phenomenon of the blade rubber 31 can be suppressed.

According to the above-described respective embodiments, the motor speed is changed using the detection result of the rain sensor 67 and the vehicle speed sensor 68, it is not limited to this configuration. The vehicle wiper device according to the present disclosure may be applicable to vehicles having no sensors among the rain sensor and the vehicle speed sensor or having one sensor between the rain sensor and the vehicle speed sensor.

The configuration of the link mechanism 22 according to the first embodiment is merely one example and may be appropriately modified.

In the above-described embodiments, the wipers 14 and 16 are exemplified as a tandem type wiper, but the wipers 14 and 16 may be configured as a symmetrical type wiper in which respective wipers move in the mutually opposite direction for the wiping.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

The present disclosure is to provide a vehicle wiper device and a method thereof capable of reducing the reversing sound of the wiper blade, suppressing the chattering phenomenon and improving the vehicle mountability thereof.

In order to achieve the above-described object, a vehicle wiper device according to the present disclosure includes: a wiper motor (18, 20); a control unit (60, 62) that drives the wiper motor to be reciprocally rotated and controls a rotation speed of the wiper motor; and a wiper (14, 16) reciprocally rotating by receiving a reciprocal rotation of the wiper motor to reciprocally wipe a wiped surface (12A) of a vehicle with a blade rubber (31), in which a tilt direction of a lip part (31A) of the blade rubber changes when a rotation direction is reversed. The control unit is configured to accelerate a rotation speed of the wiper motor, in a first acceleration section (AS1) where a tilt direction of the lip part is changed, from 0 to a first speed (V1) which is a low speed at a first average acceleration (AC1), and to rapidly accelerate the rotation speed of the motor, in a first half of a second acceleration section (AS2) subsequent to the first acceleration section, to reach a speed which is higher than the first speed and ½ times of a second speed (V2) at an average acceleration which is twice or more of the first average acceleration.

Further, in order to achieve the above-described object, a method for controlling a vehicle wiper device is provided in which a wiper is reciprocally rotated by receiving a reciprocal rotation of a wiper motor to reciprocally wipe a wiped surface of a vehicle with a blade rubber of the wiper, and a tilt direction of a lip part of the blade rubber changes when a rotation direction of the wiper is reversed. The method includes steps of: accelerating a rotation speed of the wiper motor, in a first acceleration section where a tilt direction of the lip part is changed, from 0 to a first speed which is a low speed at a first average acceleration; and rapidly accelerating the rotation speed of the motor, in a first half of a second acceleration section subsequent to the first acceleration section, to reach a speed which is higher than the first speed and ½ times of a second speed at an average acceleration which is twice or more of the first average acceleration.

According to the present disclosure, in the first acceleration section where a tilt direction of the lip part is changed, the rotation speed is accelerated from 0 to a first speed which is a low speed at a first average acceleration. The first speed is set to be a low speed, whereby the reversing sound caused by the above-described change of the tilt direction can be reduced. Further, in the second acceleration subsequent to the first acceleration section, the rotation speed of the wiper motor is accelerated to reach a speed which is higher than the first speed and ½ times of a second speed at an average acceleration which is twice or more of the first average acceleration. With this acceleration to the ½ times speed of the second speed, since the frictional coefficient of the blade rubber with respect to the wiped surface becomes low, the chattering phenomenon of the blade rubber can be suppressed. Further, since the wiper motor is configured to be reciprocally rotated, comparing a configuration in which unidirectional rotation movement of the wiper motor into a reciprocating rotational movement of the wiper, the link mechanism can be removed and an operation space can be reduced. Hence, a mountability to the vehicle can be improved.

What is claimed is:

1. A vehicle wiper device comprising:
a wiper motor;
a control unit that drives the wiper motor to be reciprocally rotated and controls a rotation speed of the wiper motor; and
a wiper reciprocally rotating by receiving a reciprocal rotation of the wiper motor to reciprocally wipe a wiped surface of a vehicle with a blade rubber, wherein a tilt direction of a lip part of the blade rubber changes when a rotation direction is reversed,
wherein
the control unit is configured to accelerate a rotation speed of the wiper motor, in a first acceleration section where a tilt direction of the lip part is changed, from 0 to a first speed which is a low speed at a first average acceleration, and to rapidly accelerate the rotation speed of the motor, in a first half of a second acceleration section subsequent to the first acceleration section, to reach a speed which is higher than the first speed and ½ times of a second speed at an average acceleration which is twice or more of the first average acceleration.

2. The vehicle wiper device according to claim 1, wherein in the first acceleration section, the tilt direction of the lip part is changed at an intermediate position in a longitudinal direction of the blade rubber.

3. The vehicle wiper device according to claim 1, wherein in a second half of a deceleration section subsequent to the second acceleration section, the control unit controls the rotation speed to be rapidly decelerated from a speed which is ½ times of the second speed to 0 at an average acceleration which is twice or more of the first average acceleration.

4. The vehicle wiper device according to claim 1, wherein in the first acceleration section, the control unit causes the rotation speed to be rapidly accelerated to reach the first speed and then restrains an acceleration of the rotation speed, thereby controlling the rotation speed to be constant or substantially constant.

5. The vehicle wiper device according to claim 1, wherein the control unit changes the rotation speed in the respective sections, based on wiping information selected by a wiper switch, rainfall information detected by a rain sensor and vehicle speed information detected by a vehicle speed sensor.

6. A method for controlling a vehicle wiper device wherein a wiper is reciprocally rotated by receiving a reciprocal rotation of a wiper motor to reciprocally wipe a wiped surface of a vehicle with a blade rubber of the wiper, and a tilt direction of a lip part of the blade rubber changes when a rotation direction of the wiper is reversed, the method comprising:
accelerating a rotation speed of the wiper motor, in a first acceleration section where a tilt direction of the lip part is changed, from 0 to a first speed which is a low speed at a first average acceleration; and
rapidly accelerating the rotation speed of the motor, in a first half of a second acceleration section subsequent to the first acceleration section, to reach a speed which is higher than the first speed and ½ times of a second speed at an average acceleration which is twice or more of the first average acceleration.

7. The method for controlling the vehicle wiper device according to claim 6, wherein
in the first acceleration section, changing the tilt direction of the lip part at an intermediate position in a longitudinal direction of the blade rubber.

8. The method for controlling the vehicle wiper device according to claim 6, wherein
in a second half of a deceleration section subsequent to the second acceleration section, controlling the rotation speed to be rapidly decelerated from a speed which is ½ times of the second speed to 0 at an average acceleration which is twice or more of the first average acceleration.

9. The method for controlling the vehicle wiper device according to claim 6, wherein
in the first acceleration section, causing the rotation speed to be rapidly accelerated to reach the first speed and then restraining an acceleration of the rotation speed, thereby controlling the rotation speed to be constant or substantially constant.

10. The method for controlling the vehicle wiper device according to claim 6, wherein
changing the rotation speed in the respective sections, based on wiping information selected by a wiper switch, rainfall information detected by a rain sensor and vehicle speed information detected by a vehicle speed sensor.

* * * * *